United States Patent
Heroor et al.

(10) Patent No.: US 10,198,307 B2
(45) Date of Patent: Feb. 5, 2019

(54) TECHNIQUES FOR DYNAMIC SELECTION OF SOLUTIONS TO STORAGE CLUSTER SYSTEM TROUBLE EVENTS

(71) Applicant: NETAPP, INC., Sunnyvale, CA (US)

(72) Inventors: Srirang Heroor, Santa Clara, CA (US); Michael Antony Joseph, Santa Clara, CA (US); Yichao Xue, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 125 days.

(21) Appl. No.: 15/087,475

(22) Filed: Mar. 31, 2016

(65) Prior Publication Data
US 2017/0286209 A1    Oct. 5, 2017

(51) Int. Cl.
*G06F 11/34*     (2006.01)
*G06F 11/07*     (2006.01)

(52) U.S. Cl.
CPC ........ *G06F 11/0793* (2013.01); *G06F 11/079* (2013.01); *G06F 11/0727* (2013.01); *G06F 11/0787* (2013.01); *G06F 11/3447* (2013.01); *G06F 11/3442* (2013.01); *G06F 11/3457* (2013.01)

(58) Field of Classification Search
CPC ............. G06F 11/3457; G06F 11/3447; G06F 11/3442
See application file for complete search history.

(56) References Cited

U.S. PATENT DOCUMENTS

| | | | | |
|---|---|---|---|---|
| 7,703,079 B1* | 4/2010 | Burrows | ............. | G06F 11/3447 700/108 |
| 8,689,227 B2* | 4/2014 | Blanding | ............. | G06F 9/5061 718/104 |
| 8,756,307 B1* | 6/2014 | Chen | ................... | G06F 11/3414 709/223 |
| 10,031,822 B2* | 7/2018 | Dimnaku | ............. | G06F 11/008 |
| 2002/0133757 A1* | 9/2002 | Bertram | ............. | G06F 11/3447 714/47.2 |
| 2003/0074161 A1* | 4/2003 | Smocha | ............. | G06F 11/3409 702/186 |
| 2009/0006071 A1* | 1/2009 | Dournov | ............. | G06F 11/3457 703/22 |

(Continued)

*Primary Examiner* — Joseph O Schell
(74) *Attorney, Agent, or Firm* — Klein, O'Neill & Singh, LLP

(57) ABSTRACT

Various embodiments are generally directed to techniques for dynamic diagnosis and/or prediction of trouble events in a storage cluster system and automated selection of solutions thereto. An apparatus includes a retrieval component to, in response to a trouble event with a first component of a storage cluster system at a usage level under a first usage type, retrieve a component model of a second component associated with a second usage type from a model database, wherein the second usage type comprises operations that differ from operations of the first usage type by no more than a predetermined threshold of difference; and a selection component to apply the first usage level to the component model to derive a resulting level of performance and determine whether to recommend installation of the second component in the first storage cluster system to address the trouble event based on the resulting level of performance.

20 Claims, 18 Drawing Sheets

(56) References Cited

U.S. PATENT DOCUMENTS

| | | | |
|---|---|---|---|
| 2009/0307597 A1* | 12/2009 | Bakman | G06F 11/008 715/736 |
| 2012/0266143 A1* | 10/2012 | Bhoovaraghavan | G06F 11/3447 717/127 |
| 2013/0282337 A1* | 10/2013 | Fujiwaka | G06F 11/3414 702/186 |
| 2015/0281015 A1* | 10/2015 | Griffith | H04L 43/0817 709/224 |

* cited by examiner

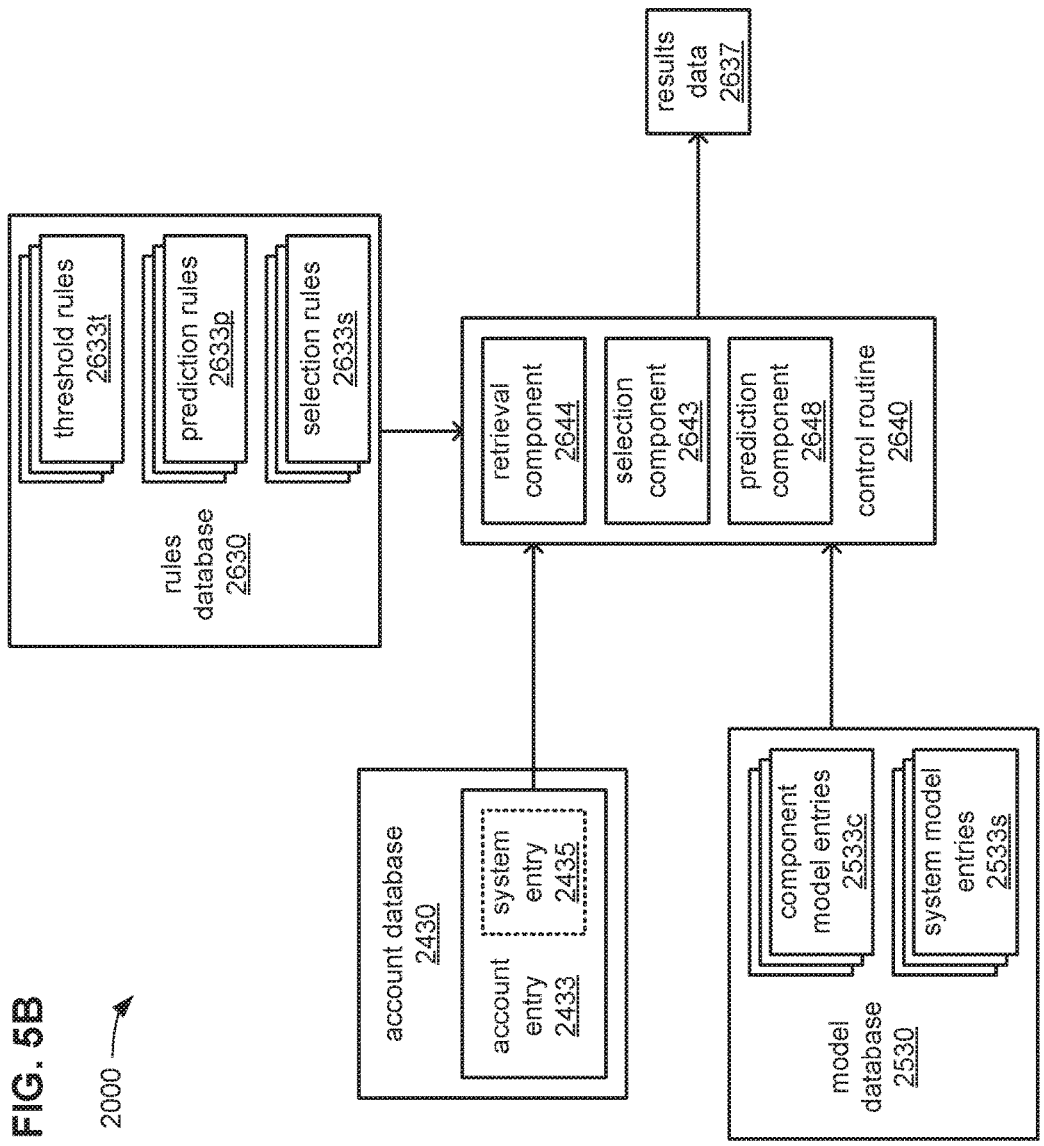

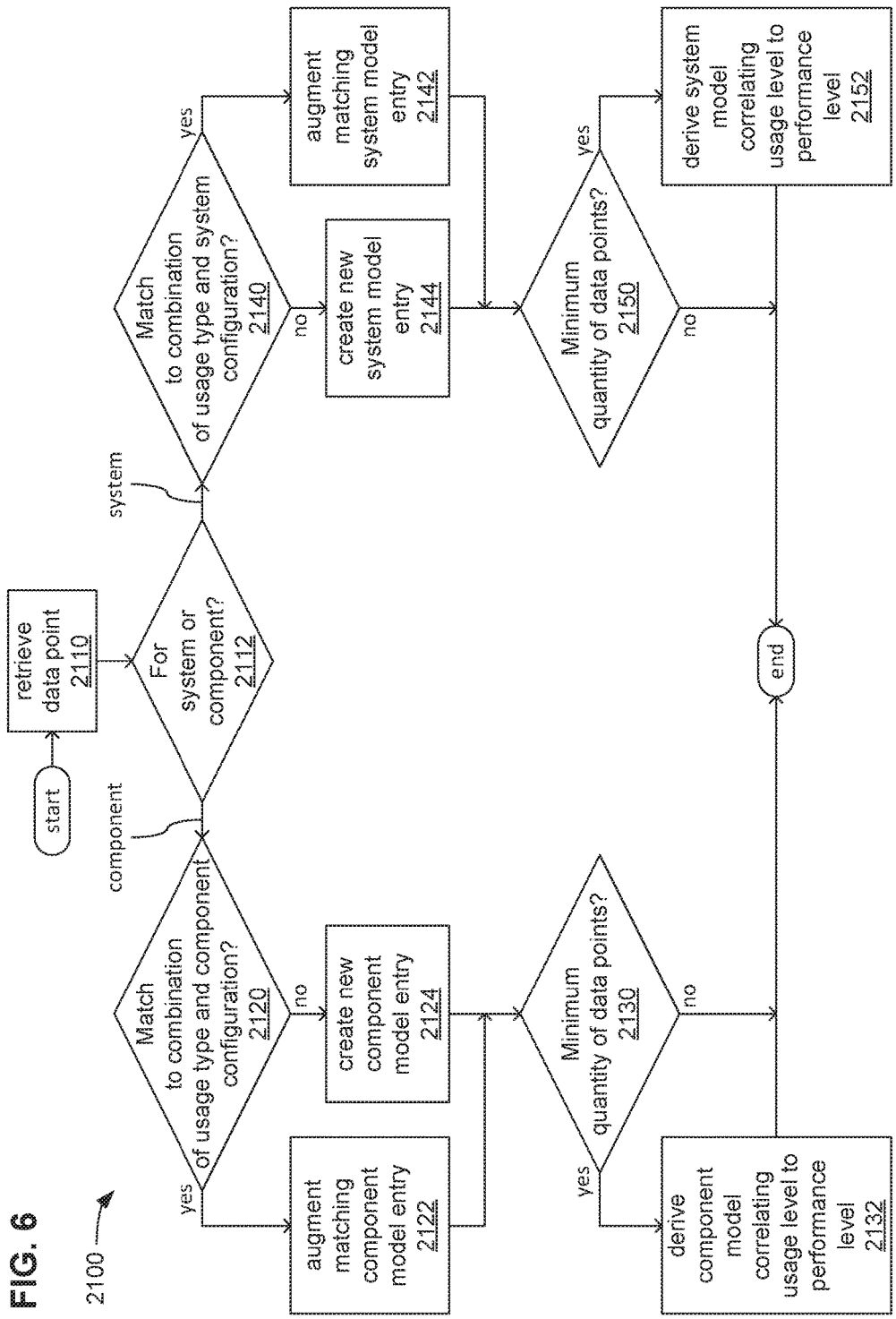

2200

TECHNIQUES FOR DYNAMIC SELECTION OF SOLUTIONS TO STORAGE CLUSTER SYSTEM TROUBLE EVENTS

BACKGROUND

Remotely accessed storage cluster systems may provide storage services in support of multiple applications simultaneously in which each of the applications may have widely differing storage requirements. To do so, such storage cluster systems are often assembled from a complex collection of hardware and software components that may be selected from a wide range of options, especially in the case of storage cluster systems made up of redundant pairs and/or sets of components to provide improved fault tolerance. Also, such storage cluster systems may be used to provide storage for any of a wide variety of applications under any of a wide variety of circumstances. Further, as time passes, needs may change and available options for replacing and/or upgrading hardware or software components of the storage cluster system may change. As a result, each storage cluster system may be of a relatively unique configuration from the date of its installation and/or may become relatively unique over time.

As a result, administrators of such storage cluster systems may encounter various challenges in diagnosing problems, maintaining, repairing and/or upgrading such storage cluster systems. By way of example, efforts by administrators to overseeing and maintain multiple storage cluster systems may be frustrated by differences among them resulting in situations where different solutions to similar problems must be derived and/or applied to different ones of those storage cluster systems. This can complicate or even preclude efforts to apply lessons learned from supporting one storage cluster system to supporting another storage cluster system. Stated differently, with so many ways in which multiple storage cluster systems under the care of the same administrator may differ from each other, it may simply not be possible to be properly prepared to address every possible combination of circumstances that may arise.

BRIEF DESCRIPTION OF THE DRAWINGS

FIGS. 5A-B, together, illustrate an example embodiment of an analysis server of an administration system.

FIG. 6 illustrates a first logic flow according to an embodiment.

DETAILED DESCRIPTION

Figure 1:
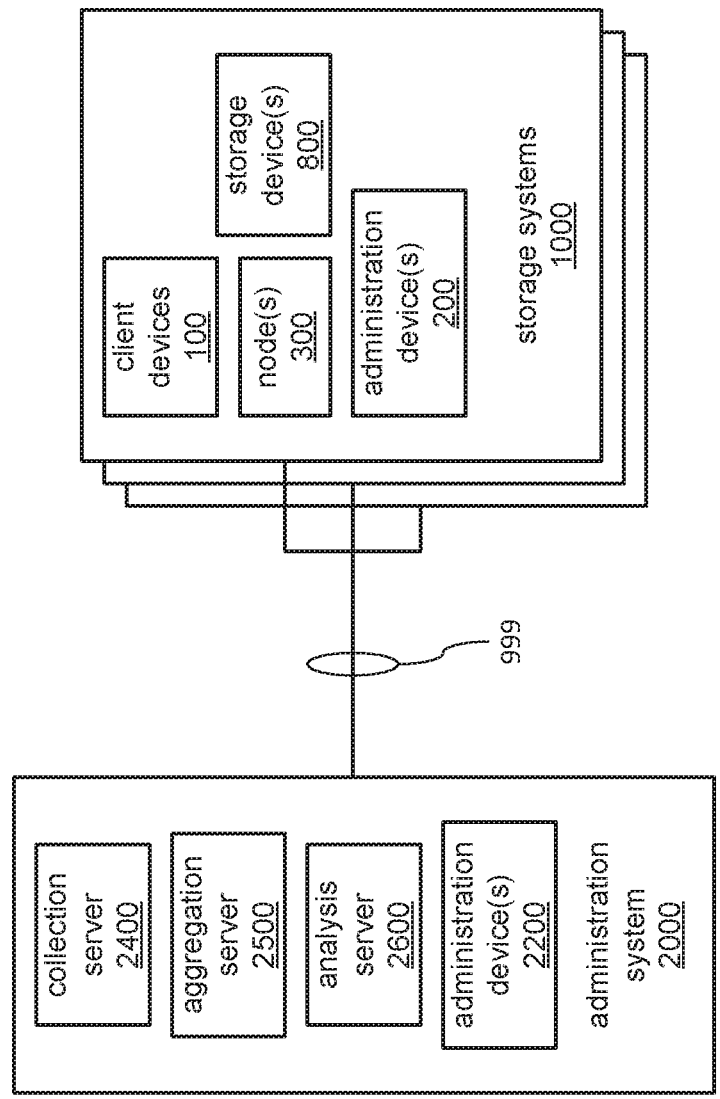
FIG. 1 illustrates an example embodiment of an administration system exchanging data with multiple storage cluster systems.

Various embodiments are generally directed to techniques for dynamic diagnosis and/or prediction of trouble events in a storage cluster system and automated selection of solutions thereto. A collection server of an administration system may recurringly receive, from one or more storage cluster systems, configuration information detailing configurations of installed components and/or aspects of their interconnections, levels and/or types of usage of those systems and/or components, resulting levels of performance of those systems and/or components, resulting frequencies of occurrence of various events, etc. The collection server may store such indications within an accounts database in which separate entries may be maintained for each storage cluster system, and/or for each organization that operates one or more storage cluster systems from which such indications may be received. An aggregation server of the administration system may recurringly access the account database to recurringly obtain information from which to generate and/or augment models of systems and/or components of different configurations and subjected to different types of usage maintained within a models database. Each model may be based on data points of different levels of usage correlated to different levels of performance taken from multiple storage cluster systems operated by different organizations and/or from multiple components of such multiple storage cluster systems. An analysis server of the administration system may recurringly access the account database to recurringly retrieve indications of failures that have actually occurred and/or indications of trends of usage types that may lead to failures. The analysis server may also recurringly access the models database to retrieve models of systems and/or components under usage types associated with such actual and/or predicted failures. The analysis server may employ such models to predict failures under particular usage types and/or to derive solutions to stop and/or prevent such failures. Such solutions may include improvements to configurations and/or utilization of components and/or systems, and/or may include installation of upgrade components within systems.

The information collected from each storage cluster system by the collection server may include indications of what hardware and/or software components make up each node of a storage cluster system, the manner in which those components are coupled, features of those components that are used and/or are not used, client applications for which client data is stored, the types and quantities of client data stored, levels of utilization of components and/or of whole storage cluster systems for each observed type of usage thereof, resulting observed levels of performance and/or utilization of resources within each component and/or system, occurrences of various events affecting storage of the client data and their outcomes, and/or the manner in which to contact one or more administrators. Such events may include component failures, instances of limits in available resources (e.g., capacity or bandwidth) being reached or exceeded, changes in the configuration of storage volumes, installations or changes in components, changes in the manner in which components are coupled, etc. The collection server may poll one or more storage cluster systems for such information on a recurring basis, and/or await transmission of such information to the collection server by one or more of the storage cluster systems via a network. One or more of the storage cluster systems may transmit such information to the collection server in response to the occurrence of one or more particular events (e.g., trouble events) as part of providing a record thereof to the administration system for subsequent diagnostics.

The storage cluster systems from which the collection server receives such information may vary greatly in complexity and capability. By way of example, one or more of the storage cluster systems may incorporate a single node providing a single controller of a relatively small quantity of storage devices that may or may not be operated together as an array of storage devices. Such relatively simple storage cluster systems may incorporate relatively few hardware components and/or software components, and may simply be used as archival or "backup" storage for the client data stored within the client devices to guard against loss of client data should a malfunction of one of the client devices occur. As a result, the information transmitted by such a relatively simple cluster storage cluster system to the collection server may correspondingly be relatively simple in content. Also such information may be transmitted relatively infrequently or in response to a change in the configuration of the storage cluster system, including a change in components.

Alternatively and also by way of example, one or more of the storage cluster systems may incorporate multiple nodes and/or numerous storage devices. Multiple sets of the storage devices may be operated together as fault-tolerant arrays on which client data may be stored in a fault-tolerant manner that prevents loss of client data in the event of a malfunction of one of the storage devices. Also, two or more of the multiple nodes may be interconnected to form high-availability (HA) groups of nodes to support redundancy among the controllers provided by each of the nodes in which one node may take over for another in the event of a failure of that other node. Further, the multiple nodes and multiple storage devices may be divided into multiple clusters that may be installed at geographically distant locations, but that may be interconnected in a manner in which the state of the client data stored within the storage devices of one cluster may be mirrored in the state of the client data stored within the storage devices of another cluster. As a result, the information transmitted by such a relatively complex storage cluster system to the collection server may correspondingly be relatively complex in content. Also such information may be transmitted relatively frequently on a timed basis and/or in response to changes in configuration of the components and/or of the storage cluster system (e.g., changes in components), as well as in response to various events (e.g., trouble events) such as a takeover between nodes or other automated resolution to a detected problem.

In various embodiments, the operator of the administration system may be a purveyor of the storage cluster systems from which the collection server receives such information, such as a manufacturer, distributor, reseller, installer and/or repairer of those storage cluster systems. Thus, each of the operators of one or more of those storage cluster systems may be a customer of such a purveyor, and so each of the operators of one or more of those storage cluster systems may be deemed an account of the operator of the administration system. Each of those storage cluster system operators may be a corporate, governmental, non-profit or other entity that employs one or more of such storage cluster systems for use in storing their own data. Alternatively or additionally, each of those storage cluster system operators may be a corporate, governmental, non-profit or other entity that operates one or more of such storage cluster systems to provide storage services and/or other services that include storage services to a multitude of end users of those services. As part of operating one or more of such storage cluster systems, each of those storage cluster system operators may employ or otherwise engage the services of one or more administrators to oversee the operation thereof. Those administrators may be responsible for allocating available storage resources, maintenance, security, performing upgrade and/or diagnosing failures. Also, the operator of the administration system may similarly employ or otherwise engage the services of one or more assisting administrators to assist the administrators associated with the storage cluster system operators. Indeed, each of such assisting administrators may be assigned a particular subset of the storage cluster system operators to which they are to provide such assistance.

Thus, the collection server may organize the account database to include a separate account entry for each operator of one or more storage cluster systems from which the collection server receives information. For each storage cluster system operator that operates more than one storage cluster system, the collection server may further organize each of their associated account entries into multiple system entries that each correspond to one of their storage cluster systems. As information is received from each of the storage cluster systems, that information may be stored within the account entry and/or a separate system entry associated with the operator of that storage cluster system and/or associated with that one of multiple storage cluster systems operated by that operator. Alternatively or additionally, the collection server may organize the information received from each of the storage cluster systems by time, such as and not limited to, the time at which an event occurred, the time at which a change in the configuration of a storage cluster system was made, and/or the time at which a piece of information was received from a storage cluster system.

Further, the collection system may store within each account entry indications of components known to have been acquired by that operator, but which may not have yet been detected by and/or indicated to the collection server as having been installed. By way of example, an operator may have bought, rented, licensed and/or otherwise obtained one or more hardware and/or software components, and/or upgrades thereto, but may not have yet installed such components in a storage cluster system under their control. This may be reflected in the lack of indication of installation of those components in configuration data received by the collection server for the storage cluster system(s) associated with that operator.

The aggregation server may maintain a model database made up of numerous models for different storage cluster systems and/or for components of storage cluster systems, and for different types of usage. As previously discussed, different storage cluster systems may differ in their configuration (e.g., in the selection of components that make up each), in the configuration of the different components that make up each (e.g., what features of each are enabled), and/or in the manner in which the components of each are interconnected. Thus, the aggregation server may maintain separate models for each such different configuration of storage cluster system. Correspondingly, the aggregation server may also maintain separate models for each component from which a storage cluster system may be created (e.g., software routines, network controllers, storage device controllers, storage devices, etc.), and may further maintain separate models for each component in each of multiple configurations of that component where the differences in configuration may include differences in combinations of features that are enabled, differences in revision or version levels, differences in the manner in which each component is coupled to other components, etc.

However, beyond maintaining separate models for different storage cluster systems and/or different components, as well as for each of those configured in different ways, the aggregation server may also maintain separate models for each of multiple different types of usage. As familiar to those skilled in the art, at different times, a storage cluster system may be employed to perform different combinations of operations, including different combinations of operations to store data, retrieve data, move data between storage devices, compare copies of data between storage devices, receive data from a network, transmit data onto a network, compress data, decompress data, encrypt data, decrypted data, de-duplicate data, reconstruct de-duplicated data, etc. Each of such operations makes use of different resources (e.g., processing resources, memory resources, network bandwidth resources, etc.) to differing degrees within each one of multiple different components of a storage cluster system. Given these differences in such characteristics between individual ones of such operations, each different combination of such operations that defines a different type of usage (or "usage type") of a storage cluster system and/or of a component thereof may also be expected to have differences in such characteristics.

These differences in levels of use of different resources among each different combination of such operations that defines a different usage type may become significant as one usage type may be more likely to cause an upper limit of a particular resource to be more readily reached or exceeded than another usage type. Stated differently, a relatively limited level of utilization of a storage cluster system or of a component thereof under one usage type may in no way reach or exceed an upper limit of an available resource, while a similar relatively limited level of utilization of the same storage cluster system or of the same component thereof under another usage type may very readily reach or exceed that upper limit. Thus, it may be deemed desirable to create separate models for each usage type for each component and/or for each configuration of storage cluster system.

In some embodiments, at least some of such models may be derived from data points generated from testing of various configurations of storage cluster systems and/or of components thereof in a series of experiments performed under controlled laboratory conditions that may be intended to establish performance benchmarks for those configurations of storage cluster systems and/or for those components thereof. Such data points may correlate levels of usage under various usage types to resulting levels of performance, where levels of performance may be measured in terms of resulting amounts of various resources consumed, resulting rates of throughput of data and/or resulting latencies in the propagation of data. As the collection server receives similar data points for the same (or relatively similar) configurations of storage cluster systems and/or for the same components thereof under the same (or relatively similar) usage types, such received data points may be employed by the aggregation server to augment and/or improve the accuracy of corresponding ones of such models.

As previously discussed, a wide selection of components from which to create storage cluster systems may result in a very wide variety of unique configurations of storage cluster systems. As a result, it may be deemed unreasonable to expect to generate data points for all possible storage cluster systems through such controlled laboratory testing as it may be deemed unreasonable to expect to perform such testing on all possible storage cluster system configurations and/or under all possible usage types. Therefore, in some embodiments, the aggregation server may recurringly access the account database of the collection server to recurringly retrieve indications of configurations of storage cluster systems, usage types to which those configurations have been subjected, levels of use for each usage type and resulting levels of performance associated with each level of use of each such usage type. Stated differently, the aggregation server may recurringly access the account database of the collection server to recurringly retrieve recently received data points.

For each such data point, the aggregation server may then compare the particular combination of storage cluster system configuration and usage type associated with that data point to all of the combinations of configuration and usage type for which models already exist in the model database to determine if there is a close enough match within a predetermined threshold to one of those existing models (e.g., a model originally that may have been earlier generated based on laboratory testing). If there is such a matching model, then the aggregation server may augment and/or improve that model with that data point. However, if there is no such matching model, then the aggregation server may generate a new model within the model database, and may use that data point as the first data point of that new model. In this way, the aggregation server may maintain a model database of models that is recurringly expanded and/or improved in accuracy based on data points received from storage cluster systems that are in actual use among a wide array of conditions created by a wide array of operators of storage cluster systems.

The analysis server may recurringly access both the account database maintained by the collection server and the model database maintained by the aggregation server. As previously discussed, the collection server may receive indications of events that have occurred during the operation of each of multiple storage cluster systems, including trouble events that adversely affect operation, such as failures, instances of limits of available resources being reached or exceeded, instances of maximum latencies being reached or exceeded, etc. As also previously discussed, the collection server may also receive indications of levels of usage associated with different types of usage for each of those multiple storage cluster systems. The analysis server may recurringly retrieve indications of such trouble events that have actually occurred, as well as retrieving indications of usage trends for each usage type. The analysis server may then recurringly retrieve corresponding models from the aggregation server to employ in conjunction with usage trends and/or indications of actual trouble events to derive predictions of upcoming trouble events and/or to select solutions to prevent and/or resolve trouble events. In so doing, the analysis server may employ one or more applicable rules within a rules database that may specify various thresholds, limits and/or conditions.

More specifically, where data maintained in the account database by the collection server indicates at least one actual occurrence of a particular trouble event involving a particular component of a particular storage cluster system and associated with a particular usage type, the analysis server may retrieve a system model for a storage cluster system of the same (or relatively similar) configuration and/or a component model for the same component (or a relatively similar component) from the model database of the aggregation server. The analysis server may then employ one or more rules of the rules database in conjunction with such models to first determine whether the particular trouble event has occurred frequently enough and/or with results severe enough to meet a minimum threshold specified by one or more rules. If not, then the analysis server may take no further action regarding the at least one occurrence of the particular trouble event. However, where such a threshold is met, the analysis server may then retrieve, from the account database of the collection server, indications of trend(s) of occurrence of the particular usage type with the particular storage cluster system and/or the particular component thereof, and may employ those trend indications to predict future frequencies of usage of the particular usage type based on one or more rules. If such predictions are for the particular usage type to continue to occur with either a similar level of frequency or with increasing frequency, then the analysis server may employ such a predicted frequency of occurrence of the particular usage type to attempt to select a solution. In so doing, the analysis server may retrieve models of alternate components and/or of alternate configurations of storage cluster systems from the model database to determine if a replacement of the particular component with an alternate component and/or a change of the configuration of the particular storage cluster system to an alternate configuration would provide an effective solution. To be deemed an effective solution, the solution may be required by the one or more rules to provide a sufficiently high level of one or more resources as to be able to prevent reoccurrences of the particular trouble event given both current and predicted levels of frequency of occurrence of the particular usage type.

Alternatively or additionally, where data maintained in the account database by the collection server leads to a prediction by the analysis server of upcoming occurrences of a particular trouble event involving a particular component of a particular storage cluster system and associated with a particular usage type, the analysis server may then employ one or more rules of the rules database in conjunction with such a prediction to first determine whether the particular trouble event will occur frequently enough and/or with results severe enough to meet a minimum threshold specified by one or more rules. If not, then the analysis server may take no further action regarding the prediction of future occurrences of the particular trouble event. However, where such a threshold is met, the analysis server may retrieve a system model for a storage cluster system of the same (or relatively similar) configuration and/or a component model for the same component (or a relatively similar component) from the model database of the aggregation server. The analysis server may then employ such a predicted frequency of occurrence of the particular usage type to attempt to select a solution. In so doing, the analysis server may retrieve models of alternate components and/or of alternate configurations of storage cluster systems from the model database to determine if a replacement of the particular component with an alternate component and/or a change of the configuration of the particular storage cluster system to an alternate configuration would provide an effective solution. Again, to be deemed an effective solution, the solution may be required by the one or more rules to provide a sufficiently high level of one or more resources as to be able to prevent reoccurrences of the particular trouble event given both current and predicted levels of frequency of occurrence of the particular usage type.

Regardless of the manner in which the analysis server is triggered to attempt to select a solution to resolve and/or prevent occurrences of a particular trouble event, where an effective solution is able to be selected, the analysis server may cooperate with one or more administration devices to graphically present aspects of the manner and/or degree by which the solution addresses the particular trouble event. However, where the analysis server is unable to identify such an effective solution, the analysis server may cooperate with the one or more administration devices to present aspects of the manner and/or degree by which one or more less desirable solutions are and/or are not able to address the particular trouble event.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of an administration system 2000 interacting with multiple storage cluster systems 1000 via a network 999. As depicted, the administration system 2000 may incorporate one or more administration devices 2200, a collection server 2400, an aggregation server 2500 and/or an analysis server 2600. As also depicted, each of the storage cluster systems 1000 may incorporate one or more client devices 100, an administration device 200, one or more nodes 300 and/or one or more storage devices 800. As further depicted, and as will be discussed in greater detail, one or more of the devices of each of the storage cluster systems 1000 may exchange data with one or more of the devices of the administration system 2000 via the network 999. The network 999 may be a single network limited to extending within a single building or other relatively limited area, may include a combination of connected networks extending a considerable distance, and/or may include the Internet.

Within each of the storage cluster systems 1000, the one or more nodes 300 may control the one or more storage devices 800 to store client data received from the one or more client devices. The one or more administration devices 200 may be operated by administrator(s) to configure aspects of the operation of the one or more nodes 300 and/or to configure aspects of the manner in which the client data is stored within the one or more storage devices 800. On a recurring basis, at least one of the nodes 300 of each of the storage cluster systems 1000 may transmit various pieces of information concerning the configuration and operation of that one of the storage cluster systems 1000 to the collection server 2400 of the administration system 2000. Within the administration system 2000, the collection server 2400 may store and organize the information received via the network 999 from at least one node 300 of each of the storage cluster systems 1000 in an account database that associates particular storage cluster systems with particular accounts. The aggregation server 2500 may recurringly access the account database to recurringly generate and/or update models for different combinations of configurations of storage cluster systems 1000 and usage types and/or for different combinations of component configurations and usage types within a model database. Again, where data is retrieved for a combination of system configuration and usage type or for a combination of component configuration and usage type for which no model has yet been generated, the aggregation server 2500 may add such a new model to the model database. The analysis server 2600 may recurringly access the account database within the collection server to analyze indications of trouble events having occurred within one or more storage cluster systems 1000, and may recurringly access the model database within the aggregation server 2500 to predict future trouble events. Where the analysis server 2600 identifies actual trouble events of sufficient severity and/or that occur with sufficient frequency, or where the analysis server 2600 predicts upcoming trouble events of sufficient severity and/or that are predicted to occur with sufficient frequency, the analysis server may employ various ones of the models within the model database to derive solutions to such trouble events.

In various embodiments, the operator of the administration system 2000 may be a purveyor of the storage cluster systems 1000 from which the collection server 2400 receives such information, such as a manufacturer, distributor, reseller, installer and/or repairer of those storage cluster systems. Thus, each of the operators of one or more of those storage cluster systems 1000 may be a customer of such a purveyor. Each of those storage cluster system operators may be a corporate, governmental, non-profit or other entity that employs one or more of such storage cluster systems for use in storing their own data. Alternatively or additionally, each of those storage cluster system operators may operate one or more of such storage cluster systems to provide storage services and/or other services that require storage to a multitude of end users of those services. As part of operating one or more of such storage cluster systems, each of those storage cluster system operators may employ or otherwise engage the services of the one or more administrators to oversee the operation thereof through operation of the one or more administration devices 200 of each of the storage cluster systems 1000. Also, the operator of the administration system 2000 may similarly employ or otherwise engage the services of the one or more assisting administrators to assist the administrators associated with the storage cluster system operators.

Figure 2A:
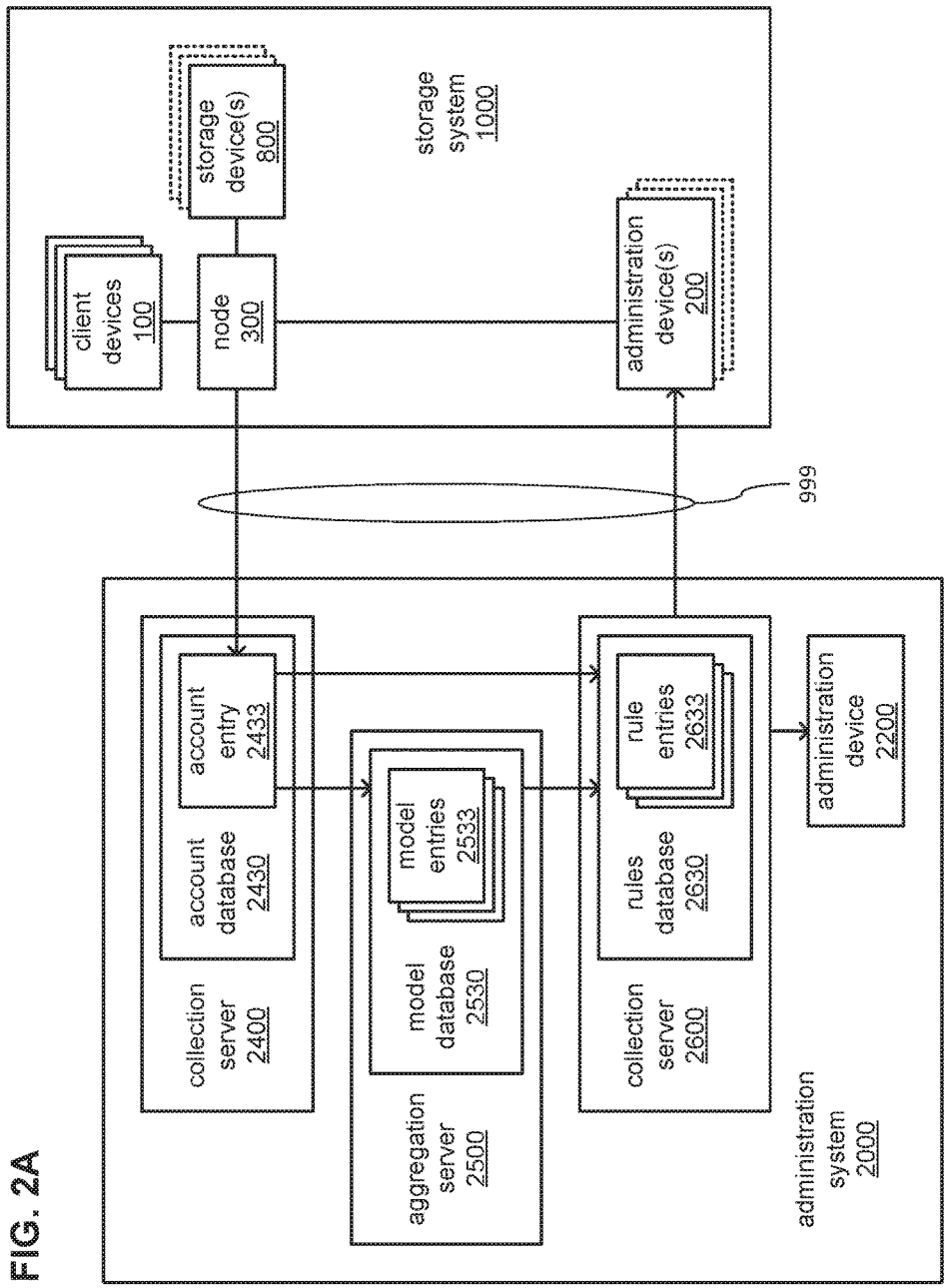
FIG. 2A illustrates an example embodiment of an administration system.
Figure 2B:
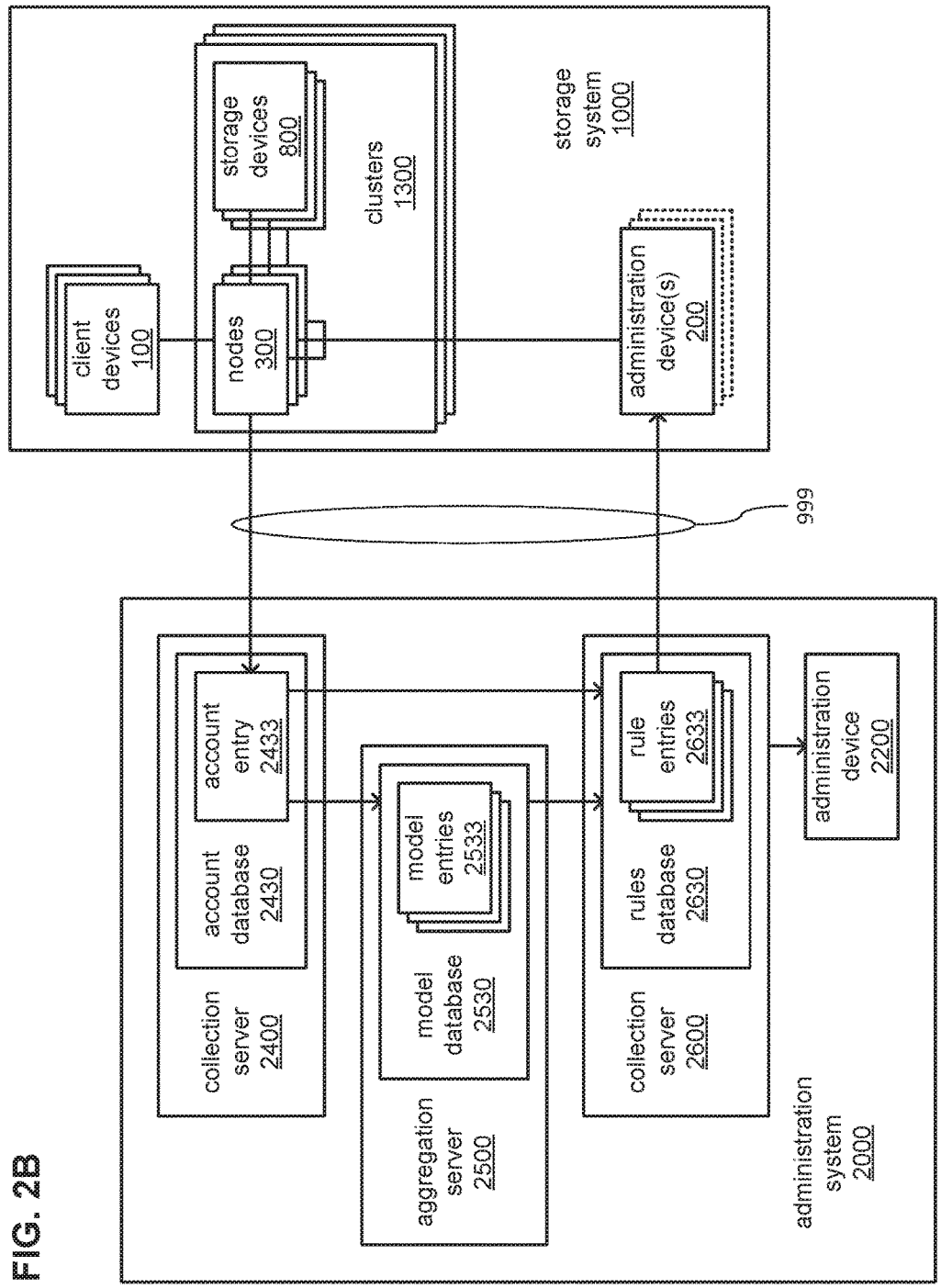
FIG. 2B illustrates an alternate example embodiment of an administration system.

FIGS. 2A and 2B each illustrate a block diagram of the administration system 2000 interacting with a storage cluster system 1000 through the network 999 in greater detail. In FIG. 2A, the administration system 2000 may interact with a relatively simple embodiment of the storage cluster system 1000 that incorporates a single node 300 that controls the one or more storage devices 800. In FIG. 2B, the administration system 2000 may interact with a relatively complex embodiment of the storage cluster system 1000 that incorporates multiple ones of the nodes 300 and of the storage devices 800 that may be organized into multiple clusters 1300 in which the manner in which client data that is stored within one set of the storage devices 800 is mirrored within another set of the storage devices 800 at what may be geographically distant locations to increase fault tolerance.

As depicted in both FIGS. 2A and 2B, and regardless of the degree of complexity of any of the multiple storage cluster systems 1000 with which the administration system 2000 interacts, the information received by the collection server 2400 from one of the nodes 300 of each of the storage cluster systems 1000 is stored within an account entry 2433 associated with an operator of one or more of the storage cluster systems 1000. For each such operator, a separate account entry 2433 is defined within an account database 2430 maintained by the collection server 2400, and each account entry 2433 may include the information received from all of the storage cluster systems 1000 operated by a single such operator.

The aggregation server 2500 recurringly accesses each of the account entries 2433 to recurringly generate and/or update models stored in model entries 2533 of a model database 2530 maintained by the aggregation server 2500. Each such model corresponds to a different combination of a configuration of a storage cluster system 1000 and a particular usage type, or a different combination of a component configuration and a particular usage type. Again, where data is retrieved from the collection server 2400 for a combination of a system configuration and usage type or for a combination of a component configuration and usage type for which no model has yet been generated, the aggregation server 2500 may add such a new model stored within a new model entry 2533 to the model database 2530.

The analysis server 2600 recurringly accesses the account entries 2433 of the account database 2430 to obtain and then analyze indications of trouble events having occurred within one or more storage cluster systems 1000, and may recurringly access the model entries 2533 of the model database 2530 to obtain models to analyze in conjunction with usage data obtained from the account entries 2433 to predict future trouble events. Where the analysis server 2600 identifies actual trouble events of sufficient severity and/or that occur with sufficient frequency, or where the analysis server 2600 predicts upcoming trouble events of sufficient severity and/or that are predicted to occur with sufficient frequency, the analysis server 2600 may employ various ones of the models within the model database 2530 to derive solutions to such trouble events.

Figure 3:
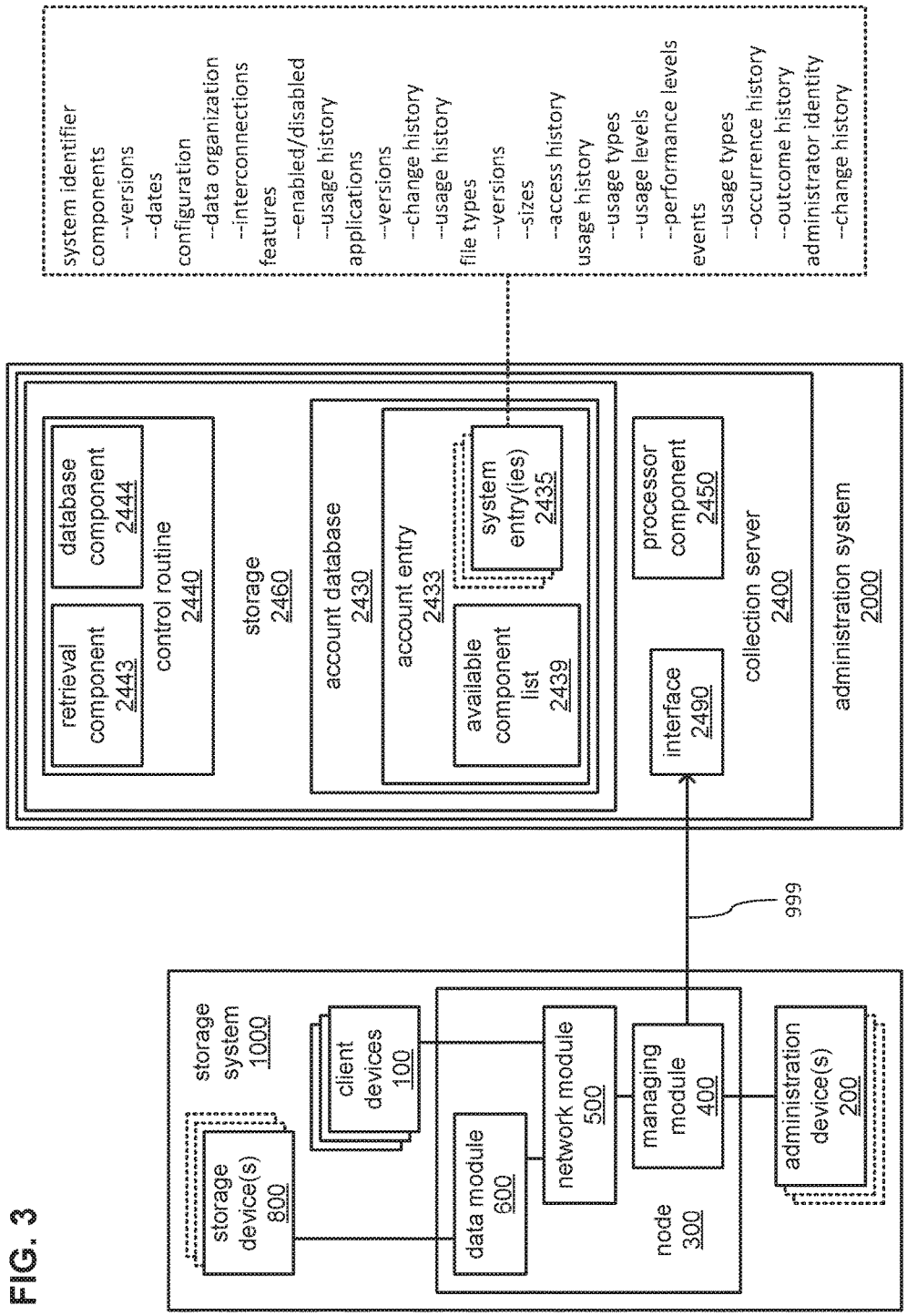
FIG. 3 illustrates an example embodiment of a collection server of an administration system.
Figure 4A:
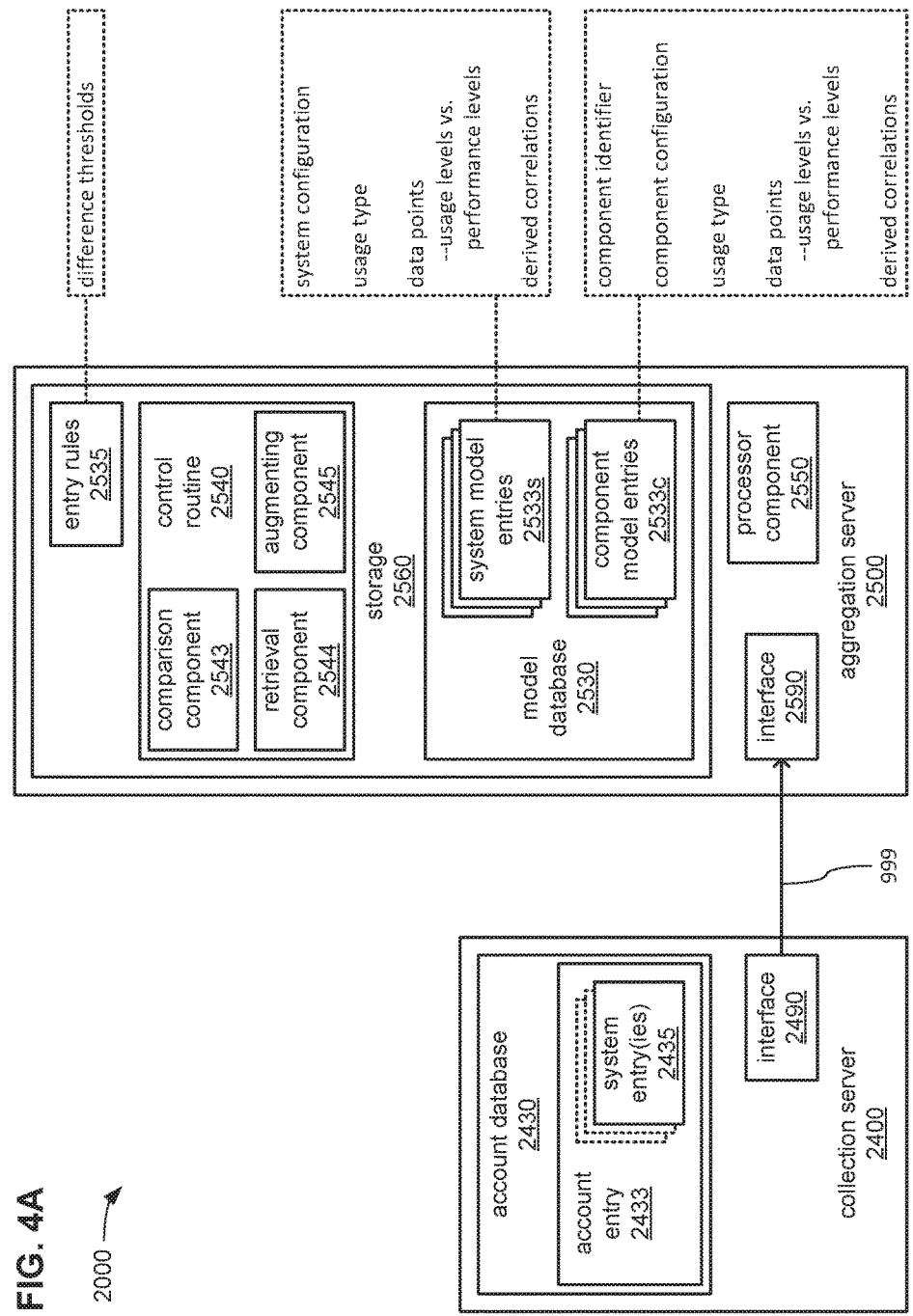
FIGS. 4A-B, together, illustrate an example embodiment of an aggregation server of an administration system.
Figure 4B:
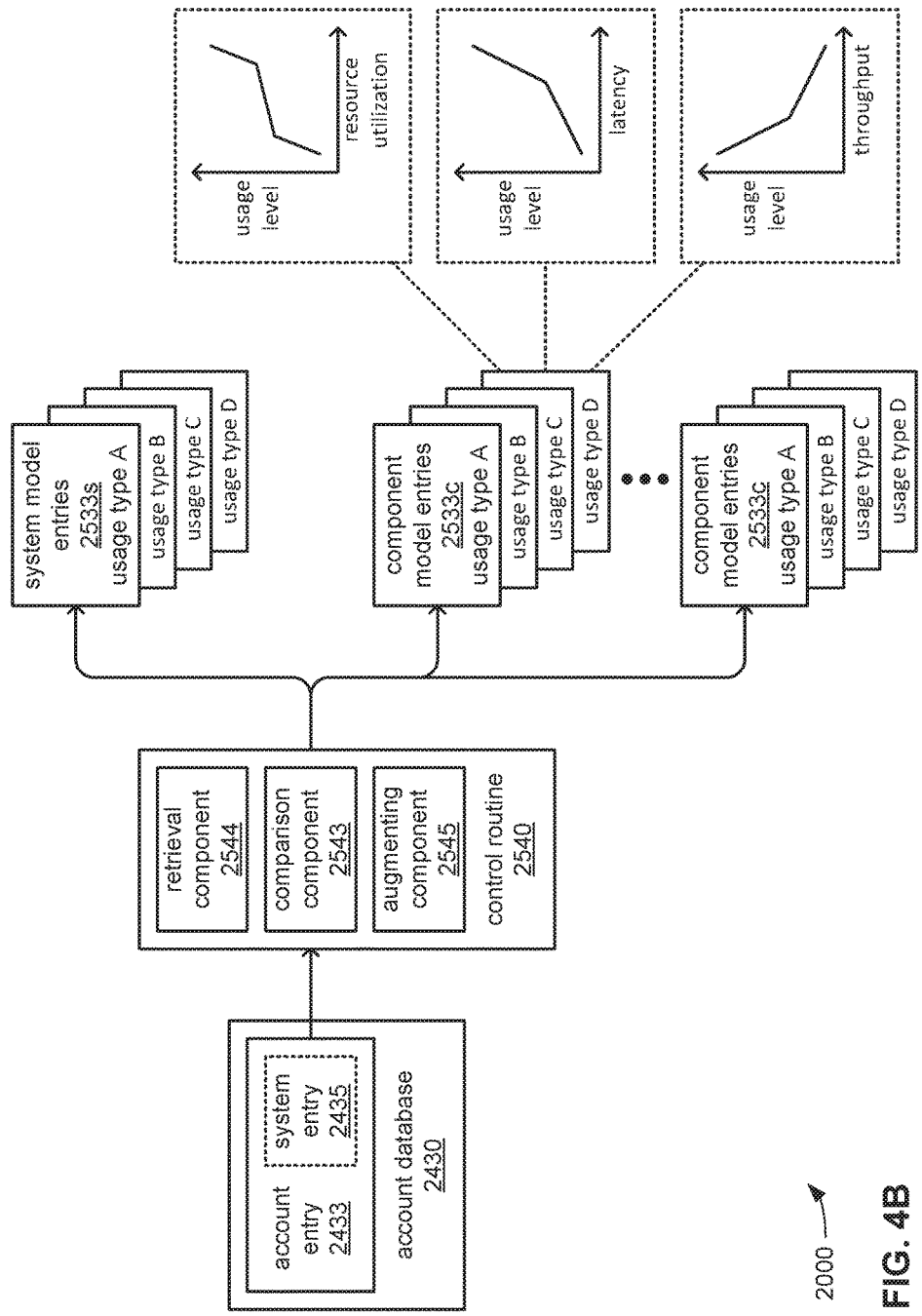

FIGS. 3, 4A-B and 5A-B each illustrate a block diagram of a portion of an embodiment of the administration system 2000 of FIG. 1 in greater detail. More specifically, FIG. 3 depicts aspects of the operating environment of an example embodiment of the collection server 2400; FIGS. 4A-B, together, depict aspects of the operating environment of an example embodiment of the aggregation server 2500; and FIGS. 5A-B, together, depict aspects of the operating environment of an example embodiment of the analysis server 2600.

Turning to FIG. 3, in various embodiments, the collection server 2400 incorporates one or more of a processor component 2450, a storage 2460 and an interface 2490 to couple the collection server 2400 to at least the network 999. The storage 2460 may store the account database 2430 and a control routine 2440. The account database 2430 may be made up of numerous ones of the account entries 2433, and each of the account entries 2433 may include one or more system entries 2435 and/or an available components list 2439. The control routine 2440 may incorporate a sequence of instructions operative on the processor component 2450 in its role as a main processor component of the collection server 2400 to implement logic to perform various functions during execution of the control routine 2440 by the processor component 2450.

As depicted, the control routine 2440 may incorporate a retrieval component 2443 executable by the processor component 2450 to operate the interface 2490 to receive information concerning the configuration and operating aspects of the one or more storage cluster systems 1000 from at least one node 300 of each. As depicted, the at least one node 300 of each of the storage cluster systems 1000 may incorporate a data module 600 to serve as a controller of the one or more storage devices 800 of that storage cluster system 1000, a network module 500 to monitor the performance of storage requests received from the one or more client devices 100, and a managing module 400 by which the at least one node 300 may be configured. As also depicted, it may be the Managing module 400 of the at least one node 300 of each of the storage cluster systems 1000 that transmits the information concerning configuration and aspects of operation. As previously discussed, each of the storage cluster systems 1000 may vary greatly in complexity from relatively simple embodiments that incorporate only a single node 300 and only a single storage device 800, to relatively complex embodiments that incorporate multiple nodes 300 and numerous storage devices 800 coupled and configured to provide multiple forms of fault tolerance.

The retrieval component 2443 may operate the interface 2490 to recurringly contact the at least one node 300 of one or more of the storage cluster systems 1000 via the network 999 to poll for such information on what may be regular intervals. Alternatively or additionally, the retrieval component 2443 may operate the interface 2490 to await transmission of such information to the collection server 2400 by one or more of the storage cluster systems 1000. Again, one or more of the storage cluster systems 1000 may transmit such information to the collection server 2400 at a recurring interval of time and/or in response to the occurrence of one or more particular events (e.g., a trouble event) as part of providing the collection server 2400 with a record thereof for subsequent diagnostics.

The information so collected from each of the storage cluster systems 1000 may include indications of various aspects of the hardware and/or software components that make up each of the storage cluster systems 1000, such as versions of those components and/or dates of manufacture of those components. Such information may include indications of the manner in which various aspects of each of the storage cluster systems 1000 are configured, such as the manner in which various hardware components thereof are coupled and/or the manner in which client data and/or other data are organized as stored within one or more of the storage devices 800. Such information may include indications of features of each of the storage cluster systems 1000 that are enabled and/or disabled, as well as features of individual hardware and/or software components, and as well as indications of the manner in which one or more of those features are configured. Such information may include indications of what applications software is used with each of the storage cluster systems 1000, including versions of those applications, histories of changes in what applications are used, and/or histories of the pattern and/or degree of usage of each of those applications. Such information may include indications of occurrences of various events within or otherwise involving each of the storage cluster systems 1000, including types of events (e.g., malfunctions, instances of exceeding storage capacity, resizing of volumes, additions and/or removals of storage devices 800, etc.), the outcomes of various events, and/or the pattern and/or frequency of occurrence of various types of events. Such information may include identities and/or contact information for one or more administrators associated with an operator of one or more of the storage cluster systems 1000 (e.g., a network address of one of the administration devices 200 that is associated with one or more of those administrators). Such information may include indications of the kind of client data stored within one or more of the storage devices 800 of each of the storage cluster systems 1000, including types of data files, versions of the file types that are used, the sizes of various types of data files, and/or the pattern and/or frequency of accesses made to various types of data files. More specifically, such information may include indications of different usage types to which a storage cluster system 1000 and/or one or more of its components may be subjected, where each usage type is defined by different combination of operations performed by a storage cluster system 1000 and/or by one or more of the components (e.g., the nodes 300) of a storage cluster system 1000. Also more specifically, such information may include measures of performance resulting from each usage type to which a storage cluster system 1000 and/or one or more of its components may be subjected, where the resulting performance measures may be defined in terms of resulting consumption of various resources, resulting data throughput, and/or resulting latencies of data propagation.

As also depicted, the control routine 2440 may incorporate a database component 2444 executable by the processor component 2450 to organize and store such information as is received from the at least one node 300 of each of the storage cluster systems 1000 in the account database 2430. As previously discussed, the account database 2430 may be divided into multiple account entries 2433 with each of the account entries 2433 storing all of such information received from one or more storage cluster systems 1000 that are operated by a single storage cluster system operator. As also previously discussed, where a single storage cluster system operator operates multiple ones of the storage cluster systems 1000, the information received from each of those storage cluster systems 1000 may be stored in separate system entries 2435 defined within the account entry 2433 associated with that storage cluster system operator. Still further, information concerning components that a storage cluster system operator is known to have acquired (e.g., purchased components, licensed components, etc.), but which have not been detected as having been installed in any of the information received from any storage cluster system 1000, may be stored as the available component list 2439 within the account entry 2433 associated with that storage cluster system operator.

Turning to FIG. 4A, in various embodiments, the aggregation server 2500 incorporates one or more of a processor component 2550, a storage 2560 and an interface 2590 to couple the aggregation server 2500 to at least the network 999. The storage 2560 may store the model database 2530, entry rules 2535 and a control routine 2540. The model database 2530 may be made up of numerous ones of the model entries 2533, which may be subdivided into two types, specifically, system model entries 2533s storing models of storage cluster systems 1000 and component model entries 2533c storing models of components thereof. The control routine 2540 may incorporate a sequence of instructions operative on the processor component 2550 in its role as a main processor component of the aggregation server 2500 to implement logic to perform various functions during execution of the control routine 2540 by the processor component 2550.

As previously discussed, different storage cluster systems 1000 may differ in their configuration, such as what components (hardware and/or software, network controllers, storage device controllers, storage devices, etc.) make up each of the storage cluster systems 1000, how those components are interconnected, the applications for which each storage cluster system 1000 is used, the quantity and/or type of client data stored by each storage cluster system, etc. As a result of so many variables in the configuration of each storage cluster system 1000, it may be deemed unrealistic to generate and maintain a single model of performance characteristics for all of the possible configurations of storage cluster systems 1000. Thus, and as depicted in FIG. 4A, there may be at least one separate model stored in a separate system model entry 2533s for each system configuration that a storage cluster system 1000 may have and/or for each system configuration that a storage cluster system 1000 is known to have had. Each such system model entry 2533s may store indications of various aspects of the particular system configuration associated with that system model entry 2533s, such as what components are included, how those components are interconnected, applications, quantity and/or type of client data, etc. The model stored therein may derived from multiple data points in which a level of usage of the particular configuration is correlated to one or more performance level measures that are observed to result, including one or more of a resulting level of use of a resource, a resulting level of latency in data propagation, a resulting level of data throughput, etc. As more data points associated with the particular system configuration are provided from the account database 2430, a more complete model of the performance characteristics of the particular system configuration (including the correlations among thereamong) may be derived and maintained.

Correspondingly, as previously discussed, each of the components of each storage cluster system 1000 may be configured in any of a variety of ways, such as what interconnections each component has with other components, what features of each component are enabled and/or disabled, version levels of each component, data storage capacities, processing speeds, etc. Thus, even where there is a single component that is widely used in many storage cluster systems 1000, the various details of how each instance of it may be configured in each of those storage cluster systems 1000 may be sufficiently different from one storage cluster system 1000 to another that it may perform very differently in each of those storage cluster systems 1000. As a result of so many variables in the configuration of such a component, it may be deemed unrealistic to generate and maintain a single model of performance characteristics for all of the possible configurations of that component. Thus, and as depicted in FIG. 4A, there may be at least one separate model stored in a separate component model entry 2533c for each component configuration that a component may have and/or for each component configuration that a component is known to have had. Each such component model entry 2533c may store indications of various aspects of the particular component configuration associated with that component model entry 2533c, such as interconnections with other components, features enabled and/or disabled, version levels, data storage capacities, processing speeds, etc. The model stored therein may derived from multiple data points in which a level of usage of the particular configuration is correlated to one or more performance level measures that are observed to result, including one or more of a resulting level of use of a resource, a resulting level of latency in data propagation, a resulting level of data throughput, etc. As more data points associated with the particular component configuration are provided from the account database 2430, a more complete model of the performance characteristics of the particular component configuration (including the correlations among thereamong) may be derived and maintained.

However, as also previously discussed, a single storage cluster system 1000 of a single particular configuration may be subjected to performing, at different times, any of a variety of widely differing combinations of uses that each define a different usage type. By way of example, each usage type may be made up of a different combination of operations to be performed, including different combinations of operations to store data, retrieve data, move data between storage devices, compare copies of data between storage devices, receive data from a network, transmit data onto a network, compress data, decompress data, encrypt data, decrypted data, de-duplicate data, reconstruct de-duplicated data, etc. Thus, each usage type may place widely differing demands for different resources provided by different components of a storage cluster system such that a relatively limited level of utilization of a storage cluster system under one usage type may in no way reach or exceed an upper limit of a particular available resource, while a similar relatively limited level of utilization of the same storage cluster system under another usage type may very readily reach or exceed that upper limit. As a result, it may be deemed unrealistic to generate and maintain a single model of performance characteristics for even a single system configuration of a storage cluster system 1000 and/or for a single component configuration of a component that covers all of the possible usage types. Thus, multiple system model entries 2533s may be generated for each system configuration of a storage cluster system 1000, where each of those multiple system model entries 2533s is associated with a different combination of that system configuration and a different usage type to which that system configuration may be subjected and/or to which that system configuration is known to have been subjected. Correspondingly, multiple component model entries 2533c may be generated for each component configuration of a component, where each of those multiple component model entries 2533c is associated with a different combination of that component configuration and a different usage type. Therefore, as depicted in FIG. 4A, each system model entry 2533s and/or each component model entry 2533c may additionally include an indication of the particular usage type associated therewith, in addition to including an indication of the configuration (system configuration or component configuration, respectively) associated therewith.

FIG. 4B depicts the considerable proliferation of models that may result, even for just one storage cluster system and its components for the depicted range of usage types A through D. From what is depicted, it can be appreciated that, even in embodiments of a model database 2530 associated with relatively few storage cluster systems 1000, such generation and separate storage of separate models for each of what may be many combinations of system configuration and usage types may result in the model database 2530 including a great many system model entries 2533s. Further, the fact of the inclusion of numerous hardware and software components in each storage cluster system 1000, in addition to such generation and separate storage of separate models for each of what may be many combinations of component configuration and usage types, may result in the model database 2530 including an exponentially greater quantity of component model entries 2533c.

FIG. 4B also depicts examples of the types of correlations that a model stored as one of the system model entries 2533s or as one of the component model entries 2533c may include. As more data points associated with a particular combination of usage type and either a particular system configuration or a particular component configuration are provided from the account database 2430 that each correlate a level of usage to one or more performance level measures, an ever more complete model of the performance characteristics of that particular system configuration or component configuration is able to be derived. More specifically, with a sufficiently complete model, correlations between usage level and one or more of resource utilization, latency of data propagation and/or data throughput may be derived. From such derived correlations, a predication may be made of what usage level associated with the particular combination of usage type and the particular system configuration or particular component configuration may lead to a trouble event in which a predetermined maximum level of utilization of a resource is met or exceeded, a predetermined maximum latency in data propagation is met or exceeded, and/or a predetermined minimum data throughput level is just barely met or fails to be met.

Again, in some embodiments, at least some of the entries 2533c and/or 2533s may store models that may be derived from data points generated from testing of various configurations of storage cluster systems and/or of components thereof under various usage types in experiments performed under controlled laboratory conditions. However, as previously discussed, the wide selection of components from which to create storage cluster systems 1000 may result in a very wide variety of unique configurations of storage cluster systems 1000 and their components such that it may be deemed unreasonable to expect to generate data points for all possible configurations under all possible usage types through such controlled laboratory testing. Thus, in some embodiments, the aggregation server 2500 may recurringly access the account database 2430 of the collection server 2400 to recurringly retrieve indications of configurations of storage cluster systems and/or components that are actually in use, usage types to which those configurations have been subjected, levels of use for each usage type and resulting levels of performance associated with each level of use of each such usage type. Stated differently, the aggregation server may recurringly access the account database of the collection server to recurringly retrieve data points recently received from multiple storage cluster systems 1000 to use in augmenting the model database 2530 as it may have originally been generated from such controlled laboratory testing.

Returning to FIG. 4A, as depicted, the control routine 2540 may incorporate a retrieval component 2544 executable by the processor component 2550 to operate the interface 2590 to recurringly access the account entries 2433 and/or system entries 2435 of the account database 2430 maintained by the collection server 2400. The retrieval component 2544 may operate the interface 2590 to recurringly contact the collection server 2400 via the network 999 to poll for the contents of each of the account entries 2433 and/or system entries 2435 on what may be a regular interval. Alternatively or additionally, the retrieval component 2544 may operate the interface 2590 to await transmission of the contents of each of the account entries 2433 and/or system entries 2435 by the collection server 2400, which may transmit such contents to the aggregation server 2500 at a recurring interval of time and/or in response to the occurrence of one or more particular changes to the contents of one of the account entries 2433 and/or system entries 2435. Among the contents of each of the account entries 2433 and/or system entries 2435 may be data points for particular combinations of usage types and storage cluster systems 1000 having particular system configurations that each correlate a level of usage of a storage cluster system 1000 under a particular usage type with an observed resulting level of performance. Alternatively or additionally, among the contents of each of the account entries 2433 and/or system entries 2435 may be data points for particular combinations of usage types and components of storage cluster systems 1000 having particular component configurations that each correlate a level of usage of a component under a particular usage type with an observed resulting level of performance. Again, the level of usage may described as a quantity of operations per a period of time (e.g., operations for second), and the resulting level of performance may be measured as a resulting level of use of a resource, a resulting level of latency of data propagation, a resulting level of data throughput, etc.

As also depicted, the control routine 2540 may incorporate a comparison component 2543 executable by the processor component 2550 to determine whether a new system model entry 2533s or a new component model entry 2533c is to be created for a newly received data point, or if an existing system model entry 2533s or an existing component model entry 2533c is to be augmented with the information conveyed by the newly received data point. More precisely, where the new data point is associated with a combination of a particular usage type and a particular system configuration of a storage cluster system 1000, the comparison component 2543 may compare that combination with the combinations of usage type and system configuration associated with each of the system model entries 2533s already included in the model database 2530. If there is a match between the combination of usage type and system configuration of the newly received data point and the combination of usage type and system configuration associated with a system model entry 2533s that is close enough to a degree meeting a minimum matching threshold specified in the entry rules 2535, then the model stored within that system model entry 2533s may be augmented with a correlation of usage level to performance level provided by that newly received data point. However, if there is no such match to a combinations of usage type and system configuration associated with any of the system model entries 2533s, then a new system model entry 2533s may be generated that is associated with the combination of usage type and system configuration of the newly received data point, and a correlation of usage level to performance level provided by that newly received data point may be stored within the new system model entry 2533s as part of deriving a model to be stored therein.

Correspondingly, where the new data point is associated with a combination of a particular usage type and a particular component configuration of a component of a storage cluster system 1000, the comparison component 2543 may compare that combination with the combinations of usage type and component configuration associated with each of the component model entries 2533c already included in the model database 2530. If there is a match between the combination of usage type and component configuration of the newly received data point and the combination of usage type and component configuration associated with a component model entry 2533c that is close enough to a degree meeting a minimum matching threshold specified in the entry rules 2535, then the model stored within that component model entry 2533c may be augmented with a correlation of usage level to performance level provided by that newly received data point. However, if there is no such match to a combinations of usage type and component configuration associated with any of the component model entries 2533c, then a new component model entry 2533c may be generated that is associated with the combination of usage type and component configuration of the newly received data point, and a correlation of usage level to performance level provided by that newly received data point may be stored within the new component model entry 2533c as part of deriving a model to be stored therein.

As further depicted, the control routine 2540 may incorporate an augmenting component 2545 executable by the processor component 2550 to augment aspects of the model database 2530 as triggered by the comparison component 2543, and based one or more of the parameters specified by the entry rules 2535. Where there is a newly received data point, and the comparison component 2543 has determined that there is a system model entry 2533s or a component model entry 2533c that represents a match to a degree sufficient to meet a minimum matching threshold specified in the entry rules 2535 (as described above), then the comparison component 2543 may trigger the augmenting component 2545 to augment the data points that may already be included in that entry 2533s or 2533c with the newly received data point. However, where the comparison component 2543 determines that there is no such match for a newly received data point, then the comparison component 2543 may trigger the augmenting component 2545 to augment the model database 2530 with a new system model entry 2533s or a new component model entry 2533c (depending on whether the new data point is associated with a whole storage cluster system 1000 or a component thereof) that includes the new data point as its first data point.

In some embodiments, if the augmentation of an entry 2533s or 2533c with a newly received data point results in that entry having a quantity of data points that meets a minimum data point threshold specified by the entry rules 2535, then the augmenting component 2545 may use the data points thereof to derive a correlation between usage levels and performance levels that may serve as a basis for making predictions. Further, if an entry 2533s or 2533c already included a quantity of data points that at least met the minimum data point threshold at a time when the augmenting component 2545 is triggered by the comparison component to add a newly received data point thereto, then the augmenting component 2545 may make use of the newly received data point along with the others that were already included in the entry 2533s or 2533c to repeat derivation of a correlation between usage levels and performance levels.

Figure 5A:
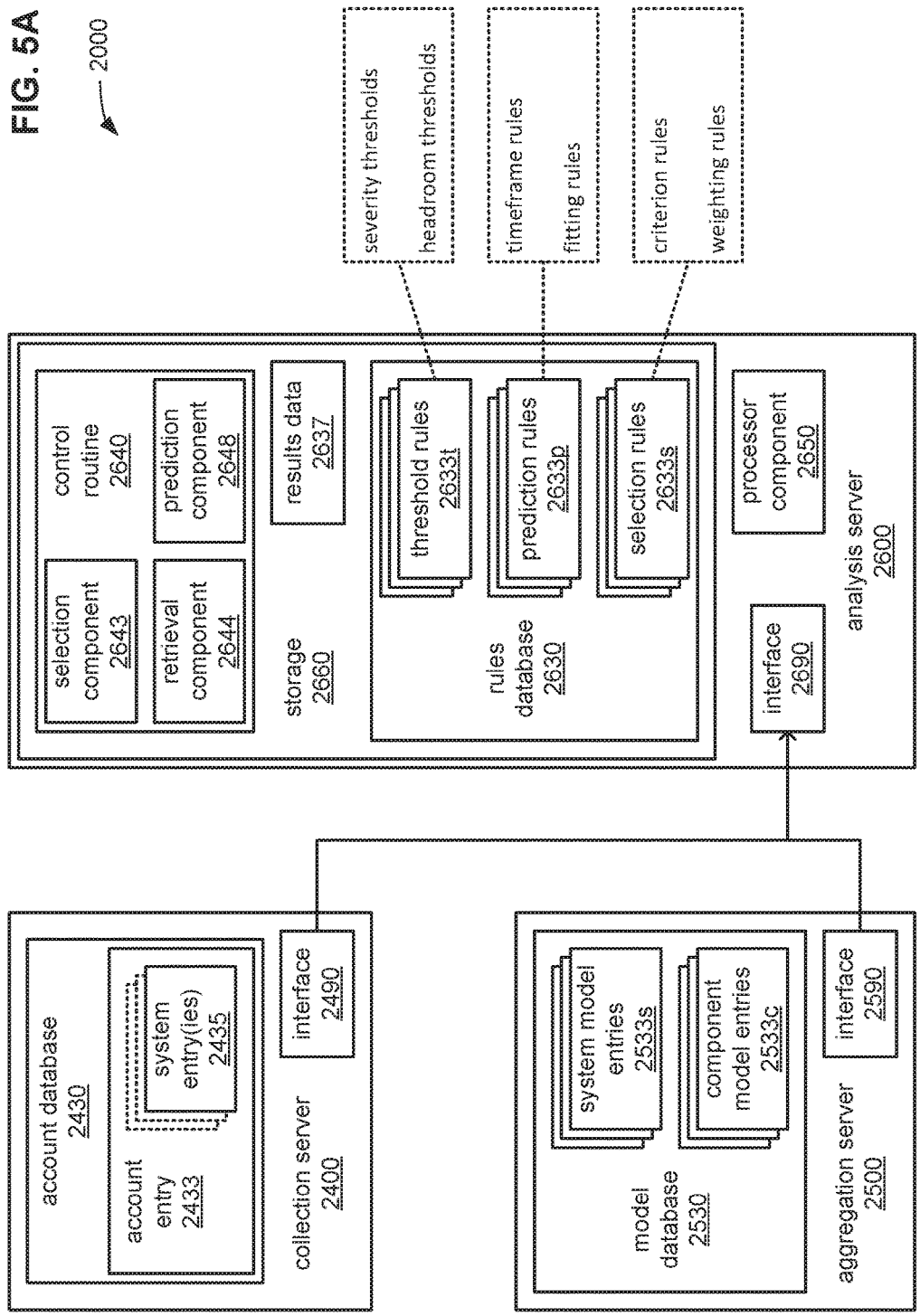

Turning to FIG. 5A, in various embodiments, the analysis server 2600 incorporates one or more of a processor component 2650, a storage 2660 and an interface 2690 to couple the analysis server 2600 to at least the network 999. The storage 2660 may store the rules database 2630, results data 2637 and a control routine 2640. The model database 2630 may be made up of numerous ones of the rules entries 2633, which may be subdivided into three types, specifically, threshold rules 2633t specifying various thresholds, prediction rules 2633p specifying various parameters for making predictions, and selection rules 2633s specifying various requirements in selecting a resolution to one or more trouble events. The control routine 2640 may incorporate a sequence of instructions operative on the processor component 2650 in its role as a main processor component of the analysis server 2600 to implement logic to perform various functions during execution of the control routine 2640 by the processor component 2650.

As depicted, the control routine 2640 may incorporate a retrieval component 2644 executable by the processor component 2650 to operate the interface 2690 to recurringly access the account entries 2433 and/or system entries 2435 of the account database 2430 maintained by the collection server 2400, and to recurringly access the system model entries 2533s and/or the component model entries 2533c of the model database 2530 maintained by the aggregation server 2500. The retrieval component 2644 may operate the interface 2690 to recurringly contact the collection server 2400 via the network 999 to poll for the contents of each of the account entries 2433 and/or system entries 2435 on what may be a regular interval, and/or may operate the interface 2690 to recurringly contact the aggregation server 2500 via the network 999 to poll for the contents of each of the system model entries 2533s and/or component entries 2533c on what may be a regular interval. Alternatively or additionally, the retrieval component 2644 may operate the interface 2690 to await transmission of the contents of each of the account entries 2433 and/or system entries 2435 by the collection server 2400, which may transmit such contents to the analysis server 2600 at a recurring interval of time and/or in response to the occurrence of one or more particular changes to the contents of one of the account entries 2433 and/or system entries 2435. Also alternatively or additionally, the retrieval component 2644 may operate the interface 2690 to await transmission of the contents of each of the system model entries 2533s and/or component model entries 2533c by the aggregation server 2500, which may transmit such contents to the analysis server 2600 at a recurring interval of time and/or in response to the occurrence of one or more particular changes to the contents of one of the system model entries 2633s and/or component model entries 2633c.

Among the contents of each of the account entries 2433 and/or system entries 2435 may be indications of a recent history of trouble events arising from particular levels of usage of particular usage types with storage cluster systems having particular system configurations and/or with components thereof having particular component configurations. Also among the contents of each of the account entries 2433 and/or system entries 2435 may be data points for particular combinations of usage types and storage cluster systems 1000 having particular system configurations that each correlate a level of usage of a storage cluster system 1000 under a particular usage type with an observed resulting level of performance. Alternatively or additionally, among the contents of each of the account entries 2433 and/or system entries 2435 may be data points for particular combinations of usage types and components of storage cluster systems 1000 having particular component configurations that each correlate a level of usage of a component under a particular usage type with an observed resulting level of performance. Such data points may convey a recent histories that correlate levels of usage of particular usage types with resulting levels of performance that enable the analysis server 2600 to make predictions of whether trouble events will occur within a predetermined time frame.

Thus, the analysis server 2600 may receive indications of trouble events that have actually occurred and may receive recent history usage levels of different usage types from which the analysis server 2600 may be able to predict upcoming trouble events. Based on such indications of trouble events that have actually occurred and/or such predictions of upcoming trouble events, the retrieval component 2644 may then recurringly retrieve models of storage cluster systems 1000 from among the system model entries 2533s and/or models of components of storage cluster system 1000 from among the component model entries 2533c associated with combinations of configuration and usage type that are at least similar to the combinations of configuration and usage type that are associated with each of the trouble events that have occurred and/or that are predicted to occur. The minimum degree of similarity (or maximum degree of difference) between such combinations on which the selection of models to be so retrieved may be specified as a minimum similarity threshold (or a maximum difference threshold) in the threshold rules 2633t. Such a threshold may specify one or more of a maximum quantity of configuration differences, a maximum quantity of interconnection differences, a maximum quantity of differences in levels of available resources (e.g., quantity of storage space, features of processor components, etc.), etc.

As also depicted, the control routine 2640 may incorporate a selection component 2643 executable by the processor component 2650 to make determinations of when to recommend a resolution to one or more particular trouble events and/or what type of resolution to recommend. Where the analysis server 2600 receives an indication of one or more actual occurrences of a particular trouble event associated with a combination of a particular usage type and either a storage cluster system 1000 of a particular system configuration or component of a storage cluster system 1000 of a particular component configuration, the selection component 2643 may then employ one or more of the threshold rules 2633t to first determine whether the particular trouble event has occurred frequently enough and/or with results severe enough to meet a minimum threshold. More specifically, regarding whether occurrences of the particular trouble event are frequent enough to meet a minimum threshold, the threshold rules 2633t may specify a minimum threshold of frequency of occurrence that must be met or exceeded for a determination to be made to take action regarding the particular trouble event. Alternatively or additionally, the threshold rules 2633t may specify a minimum degree by which a predetermined maximum level of utilization must be exceeded, a minimum degree by which a predetermined maximum latency in data propagation must be exceeded, or a minimum degree by a level of data throughput must fall below a predetermined minimum level of data throughput in at least one occurrence of the particular trouble event for the particular trouble event to be deemed severe enough to take action regarding it. If not, then the selection component 2643 may take no further action regarding the at least one occurrence of the particular trouble event. It may be deemed desirable to take no further action where a particular type of trouble event occurs only under relatively rare or unusual circumstances and/or is relatively innocuous in its effects.

As further depicted, the control routine 2640 may incorporate a prediction component 2648 executable by the processor component 2650 to make predictions of levels of use of various usage types within a predetermined time frame. The selection component 2643 may recurringly analyze the recent histories of levels of usage of various usage types with each of the storage cluster systems 1000 for which the collection server 2400 receives and maintains information to identify instances where there is a trend of increasing levels of usage of one or more usage types with a particular storage cluster system 1000 and/or one or more of the components thereof. Where such an increasing trend of usage is identified for a particular usage type with a storage cluster system 1000 having a particular system configuration and/or a component thereof having a particular component configuration, the prediction component 2648 may be triggered to predict the highest level of usage thereof within the predetermined time frame. Various parameters and/or assumptions employed in making such predictions may be specified by the prediction rules 2633p, including how far into the future the predetermined time frame extends. The retrieval component 2644 may then be triggered to retrieve system models of storage cluster systems 1000 that are associated with the same (or relatively similar) combinations of usage type and system configuration from one or more of the system model entries 2533s, and/or to retrieve component models of components of storage cluster systems that are associated with the same (or relatively similar) combinations of usage type and component configuration from one or more of the component model entries 2533c. The selection component 2643 may then employ the highest predicted level of usage of the particular usage type with each of such retrieved models to determine if such a predicted level of usage would lead to any occurrences of a trouble event. In so doing, the selection component 2643 may employ one or more of the threshold rules 2633t that specify a maximum resource usage threshold, a maximum data propagation latency threshold and/or a minimum data throughput threshold, and may base a determination of whether a trouble event is predicted on whether one or more of such thresholds are violated. If not, then the selection component 2643 may take no further action. However, the occurrence of trouble events is predicted, then the selection component 2643 may then employ one or more of the threshold rules 2633t to first determine whether the particular trouble event will occur frequently enough and/or will the results be severe enough to meet a minimum threshold. If not, then the selection component 2643 may take no further action regarding the at least one occurrence of the particular trouble event.

However, where a minimum threshold is met for frequency of occurrence or for severity of effects of either trouble events that have actually occurred or trouble events that are predicted to occur, the selection component 2643 may trigger the retrieval component 2644 to retrieve further system models from among the system model entries 2533s and/or component models from among the component model entries 2533c. With each of such retrieved model, the selection component 2643 may employ the highest observed level of usage of the particular usage type associated with an actually occurring trouble event or the highest predicted usage level of the particular usage type associated with a predicted trouble event to test various possible resolutions. The first of such retrieved models may be system models of storage cluster systems 1000 that have the same components as the particular storage cluster system 1000 and are associated with the same (or similar) usage type, but have different system configurations from the particular storage cluster system. Also among the first of such retrieved models may be component models of the same components of the particular storage cluster system 1000 and are associated with the same (or similar) usage type, but have different component configurations from the components of the particular storage cluster system. These first such retrieved models may then be tested with the highest observed or predicted usage levels of the particular usage type to determine whether use of the same hardware and software components in the particular storage cluster system, but with different configurations may be a sufficient resolution. Stated differently, the selection component 2643 may test whether a change in nothing more than a configuration may be a sufficient resolution. Such a change may include a change to a software setting to enable/disable a feature and/or a change in the manner in which two or more of the components are interconnected, but not a change in what hardware or software components are used such that no components not already incorporated into the particular storage cluster system 1000 need be procured and/or installed therein. To be deemed an effective resolution, the configuration change may be required by one or more of the selection rules 2633s to provide a sufficiently high level of one or more resources, to provide a sufficiently high level of data throughput and/or to provide a sufficiently low level of latency as to be able to prevent reoccurrences of the particular trouble event at the highest observed or predicted level of usage of the particular usage type with a predetermined degree of margin.

If changes to system configuration and/or component configuration do not provide a resolution under such rules, then the selection component 2643 may trigger the retrieval component 2644 to retrieve the available component list 2439 (if there is one) from the account entry 2433 associated with the storage cluster system operator that operates the particular storage cluster system. If there are any hardware or software components within the component list 2643 that differ from the components already employed in the particular storage cluster system such that one or more of the available components in the available component list 2439 are able to be installed in the particular storage cluster system 1000 (e.g., substituted for or added to components already included in the particular storage cluster system 1000), then the selection component 2643 may trigger the retrieval component 2644 to retrieve at least component models for those components that are associated with the same (or similar) usage type, and which may be associated with similar and/or differing configurations. These retrieved models associated with such one or more available components may then be tested with the highest observed or predicted usage levels of the particular usage type to determine whether use of any of such available components may be a sufficient resolution. Stated differently, the selection component 2643 may test whether a change involving the installation of available, but currently unused one or more components, may be a sufficient resolution. To be deemed an effective resolution, installation of such available one or more components may be required by one or more of the selection rules 2633s to provide a sufficiently high level of one or more resources, to provide a sufficiently high level of data throughput and/or to provide a sufficiently low level of latency as to be able to prevent reoccurrences of the particular trouble event at the highest observed or predicted level of usage of the particular usage type with a predetermined degree of margin. More specifically, to be deemed an effective resolution, installation of such one or more available components should result in a sufficient increase in availability in one or more resources that the observed or predicted usage level of the particular usage type results in a level of usage of the one or more resources that remains below the predetermined maximum level of utilization. Also, to be deemed an effective resolution, installation of such one or more available components should result in a sufficient increase data handling capacity that the observed or predicted usage level of the particular usage type results in a level of latency that remains below the predetermined maximum latency. Further, to be deemed an effective resolution, installation of such one or more available components should result in a sufficient increase in data handling capacity that the observed or predicted usage level of the particular usage type results in a level of throughput of data that remains above the predetermined minimum level of data throughput.

If changes involving installation of such available components already in the possession of the operator of the particular storage cluster system 1000 do not provide a resolution, then the selection component 2643 may resort to performing the same type of testing with models associated with components not already in the possession of that operator, and based on the same rules for determining whether an effective solution has been identified. Such components may be selected from an inventory of a different entity, such as a manufacturer and/or other purveyor of storage cluster systems 1000 and/or of components thereof. In so doing, models for new and/or upgraded versions of components already included in the particular storage cluster system may be employed to determine if installation of such use of newer and/or upgraded versions in the particular storage cluster system 1000 (e.g., substituted for or added to components already included in the particular storage cluster system 1000) may be a sufficient resolution.

Regardless of the manner in which the analysis server is triggered to attempt to select a solution to resolve and/or prevent occurrences of a particular trouble event, where an effective solution is able to be identified by such testing of an actual or predicted usage level of a usage type with one or more component models and/or system models, the selection component may cooperate with one or more of the administration devices 200 and/or 2200 to graphically present aspects of the manner and/or degree by which the one or more solutions address the particular trouble event. However, where the selection component 2643 is unable to identify such an effective solution, the selection component 2643 may cooperate with the one or more administration devices 200 and/or 2200 to present aspects of the manner and/or degree by which one or more less desirable solutions are and/or are not able to address the particular trouble event.

FIG. 6 illustrates one embodiment of a logic flow 2100. The logic flow 2100 may be representative of some or all of the operations executed by one or more embodiments described herein. More specifically, the logic flow 2100 may illustrate operations performed by the processor component 2550 in executing at least the control routine 2540, and/or performed by other component(s) of the aggregation server 2500. Alternatively, the logic flow 2100 may illustrate operations performed by a processor component and/or other component(s) of a server that combines the functionality of the aggregation server 2500 and one or both of the collection server 2400 and the analysis server 2600.

At 2110, a processor component of a server (e.g., the processor component 2550 of the aggregation server 2500, or a processor component of a server combining the aggregation server 2500 with one or more other servers) may retrieve information concerning at least one data point correlating a level of usage of a particular usage type to a level of performance of a particular configuration of a storage cluster system or of a component. At 2112, the processor component may determine whether the data point is associated with a particular combination of a usage type and a system configuration of a storage cluster system (e.g., one of the storage cluster systems 1000), or a particular combination of a usage type and a component configuration of a component of a storage cluster system.

Where the data point is associated with a particular combination of a usage type and a component configuration of a component of a storage cluster system, the processor component may check at 2120 whether there is a match between that particular combination and a combination of usage type and component configuration associated with a component model entry of a model database (e.g., one of the component model entries 2533c of the model database 2530). Again, the determination of whether there is a match may be based on a determination of whether there is a sufficient degree of a match as to meet a predetermined minimum matching threshold. If there is such a match at 2120, then the processor component may augment the component model entry that is associated with the matching combination of usage type and component configuration with the at least one data point at 2122. However, if there is no such match at 2120, then the processor component may create a new component model entry at 2124 in which the processor component may store the at least one data point. At 2130, the processor component may determine whether there are enough data points in the component model entry that was augmented at 2122 or generated at 2124 to derive a component model correlating usage levels to performance levels. Again, the determination of whether there is a sufficient quantity of data points may be based on a determination of whether there is a sufficient quantity of data points to meet a predetermined minimum data point threshold. If there is such a quantity of data points at 2130, then such a model may be derived at 2132.

Alternatively, where the data point is associated with a particular combination of a usage type and a system configuration of a storage cluster system, the processor component may check at 2140 whether there is a match between that particular combination and a combination of usage type and system configuration associated with a system model entry of a model database (e.g., one of the component model entries 2533s of the model database 2530). If there is such a match at 2140, then the processor component may augment the system model entry that is associated with the matching combination of usage type and system configuration with the at least one data point at 2142. However, if there is no such match at 2140, then the processor component may create a new system model entry at 2144 in which the processor component may store the at least one data point. At 2150, the processor component may determine whether there are enough data points in the system model entry that was augmented at 2142 or generated at 2144 to derive a system model correlating usage levels to performance levels. If there is such a quantity of data points at 2150, then such a model may be derived at 2152.

Figure 7A:
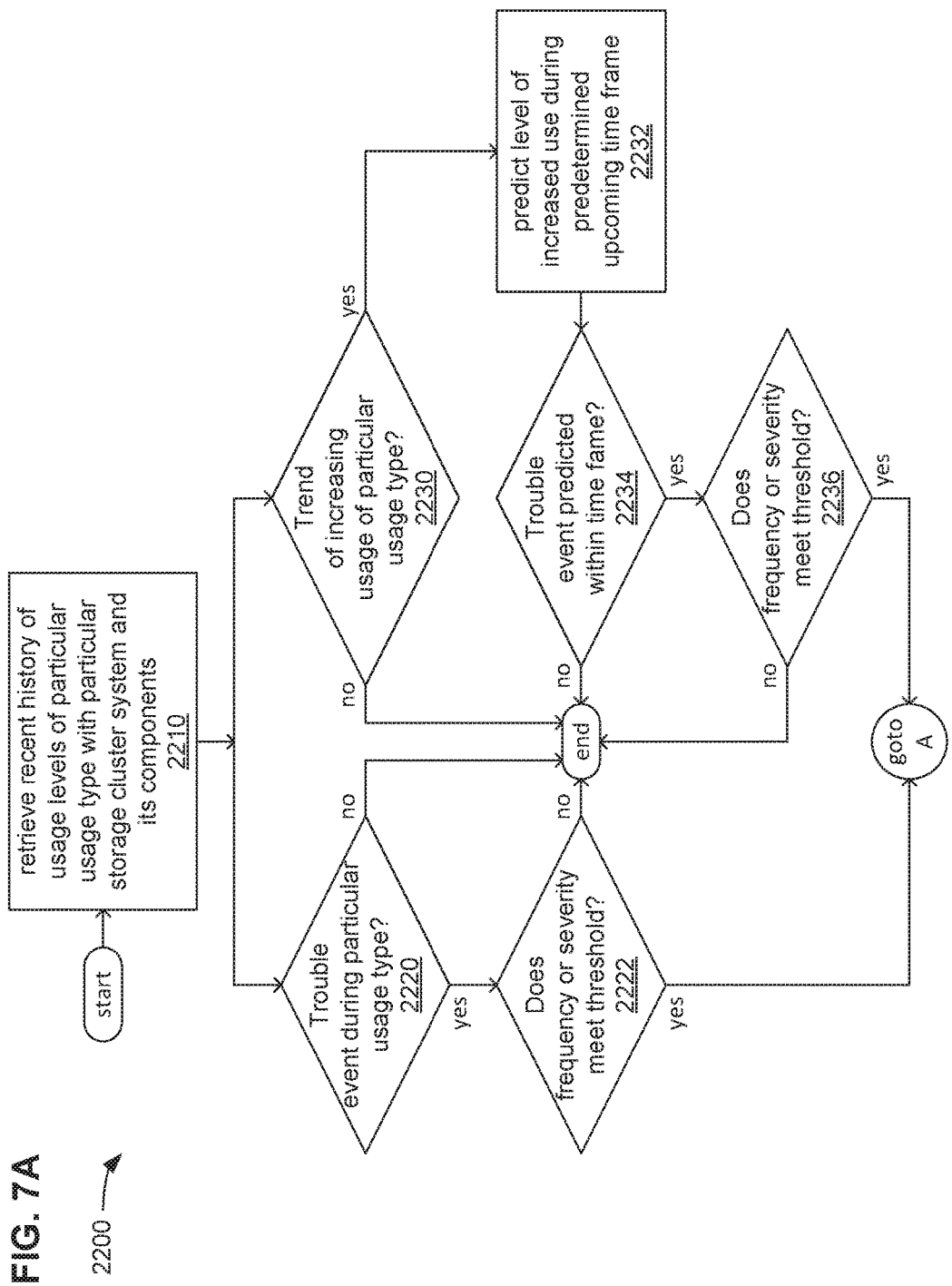
FIGS. 7A-B, together, illustrate a second logic flow according to an embodiment.
Figure 7B:
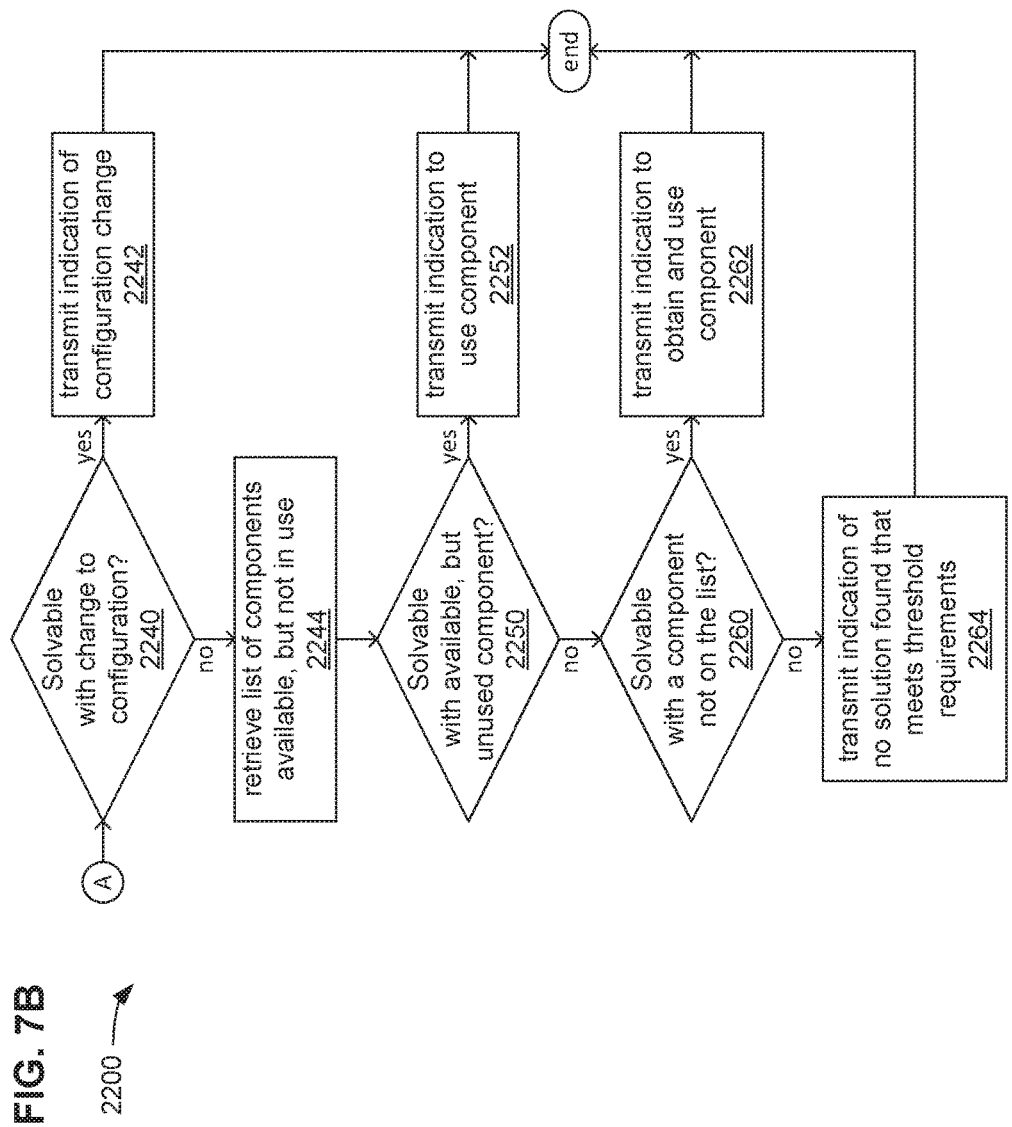

FIGS. 7A and 7B, together, illustrate one embodiment of a logic flow 2200. The logic flow 2200 may be representative of some or all of the operations executed by one or more embodiments described herein. More specifically, the logic flow 2200 may illustrate operations performed by the processor component 2650 in executing at least the control routine 2640, and/or performed by other component(s) of the analysis server 2600. Alternatively, the logic flow 2200 may illustrate operations performed by a processor component and/or other component(s) of a server that combines the functionality of the analysis server 2600 and one or both of the collection server 2400 and the aggregation server 2500.

At 2210, a processor component of a server (e.g., the processor component 2650 of the analysis server 2600, or a processor component of a server combining the analysis server 2600 with one or more other servers) may retrieve, from an account entry and/or a system entry of an account database maintained by a collection server (e.g., an account entry 2433 and/or a system entry 2435 of the account database 2430 maintained by the collection server 2400), indications of a recent history of levels of usage of a particular usage type with a particular storage cluster system (e.g., one of the storage cluster systems 1000) and components thereof. Following such retrieval of such recent history, the processor component may make check at 2220 to determine if any trouble events have actually occurred during operation of the particular storage cluster system 2220 under the particular usage type. Also following such retrieval of such recent history, the processor component may check at 2230 if there is a trend of increasing usage of the particular usage type with the particular storage cluster system.

If, at 2220, there have been any such trouble events, then the processor component may check at 2222 if either the frequency of occurrence of those trouble events or the severity of those trouble events meet a threshold such that action should be taken to address such trouble events. In so doing, the processor component may employ one or more threshold rules (e.g., the threshold rules 2633t) that may specify one or more threshold levels of frequency of occurrence and/or severity. Such thresholds may be set to prevent relatively unusual trouble events and/or relatively rarely occurring trouble events from triggering what may be deemed to be unnecessary efforts at prevention and/or correction. As familiar to those skilled in the art, odd combinations of circumstances and/or events may lead to a rare occurrence of a trouble event that may never reoccur.

If, at 2230, there is a trend of increasing usage of the particular usage type with the particular storage cluster system, then the processor component may employ one or more prediction rules (e.g., the prediction rules 2633p) and the retrieved history of that to derive a prediction at 2232 of the highest level of usage of the particular usage type with the particular storage cluster system that can be expected within a predetermined time frame into the future. The predetermined time frame and/or other parameters in making predications may be specified by the prediction rules. At 2234, the processor component may employ one or more threshold rules (e.g., the threshold rules 2633t) to determine whether the predicted highest level of usage leads to a prediction of a trouble event.

To make such a determination at 2234 with regard to entirety of the particular storage cluster system, the processor component may retrieve, from a system model entry of a model database maintained by an aggregation server (e.g., a system model entry 2533s of the model database 2530 maintained by the aggregation server 2530), a system model associated with a combination of system configuration and usage type that matches the combination of the system configuration of the particular storage cluster system and the particular usage type to a degree that is within a predetermined minimum matching threshold. The processor component may use that retrieved system model and one or more threshold rules that define maximum resource utilization, maximum latency and/or minimum data throughput thresholds to determine if the predicted level of utilization of the particular usage type with the particular storage cluster system would result in a violation of a threshold that is deemed to be a trouble event such that a trouble event is predicted within the time frame at 2234. However, to make such a determination at 2234 with regard to individual components of the particular storage cluster system, the processor component may also retrieve, from multiple component model entries of the model database maintained by the aggregation server (e.g., multiple ones of the component model entries 2533c), multiple component models that are each associated with a combination of component configuration and usage type that matches a combination of component configuration of at least one of multiple components of the particular storage cluster system and the particular usage type to a degree that is within a predetermined minimum matching threshold. The processor component may use those retrieved component models and one or more threshold rules that define maximum resource utilization, maximum latencies and/or minimum data throughput thresholds to determine if the predicted level of utilization of the particular usage type with the particular storage cluster system would result in a violation of a threshold involving any of those components of the particular storage cluster system that, again, is deemed to be a trouble event such that a trouble event is predicted within the time frame at 2234.

If one or more trouble events are predicted at 2234, then the processor component may check at 2236 if either the predicted frequency of occurrence of any of those trouble events or the severity of any of those trouble events meet a threshold such that action should be taken to address such trouble events. Again, in so doing, the processor component may employ one or more threshold rules that may specify one or more threshold levels of frequency of occurrence and/or severity.

If a determination is made at either 2222 or 2236 that trouble events of sufficient frequency or sufficient severity either have occurred or are predicted to occur, then at 2240, the processor component may determine whether a change to the system configuration of the particular storage cluster system and/or a change to a component configuration of one or more of the components of the particular storage cluster system would be sufficient to resolve the actual or predicted trouble events. In making this determination, the processor component may identify and retrieve one or more system models and/or component models from the model database that are each associated with a matching usage type, but are each also associated with a configuration that differs in a manner that does not entail the use of different (e.g., configuration differences such as software-based settings and/or manner of interconnection among the same components, and not the installation of different components). The processor component may then apply actual usage levels of the usage type at which trouble events have actually occurred or predicted usage levels of the usage type at which trouble events are predicted to occur to each of such retrieved models to attempt to identify one or more of such other configurations that do not appear to be susceptible to such trouble events. If one or more of such other configurations are identified at 2240, then the one of such other configurations that meets one or more selection rules may be selected, and an indication of a change to be made in the current configuration of the at least a component of the particular storage system to match the selected configuration may be transmitted by the processor component to an administrator device at 2242. The one or more selection rules may specify a minimum degree by which the selected configuration must prevent recurrences of the actual or predicted trouble event(s), and/or other criteria by which the selected configuration is so selected.

However, if at 2240, no other configuration is identified that resolves the actual or predicted trouble events, then at 2244, the processor component may retrieve a list of unused components for storage cluster systems that are known to have been acquired by the operator of the particular storage cluster system, but are not currently in use. Such information regarding unused components may be maintained in each of the account entries of the account database. The processor component may then identify and retrieve one or more component models from the model database that are associated with a matching usage type, but are also associated with a configuration that employs one of the unused components in place of (or in addition to) one or more of the current components of the particular storage cluster system. The processor component may then apply actual usage levels of the usage type at which trouble events have actually occurred or predicted usage levels of the usage type at which trouble events are predicted to occur to each of such retrieved models to attempt to identify one or more of such unused components that may be used in place of or in addition to one or more current components of the particular storage cluster system to resolve such trouble events. Again, the one or more selection rules may specify a minimum degree by which use of the one or more unused components must resolve the trouble events to be identified as providing a successful resolution. If one or more of such unused components are identified at 2250, then an indication to use the one or more unused components may be transmitted to an administrator device at 2252.

However, if none of the unused components are identified as resolving the actual or predicted trouble events, then at 2260, the processor component may then identify and retrieve one or more component models from the model database that are associated with a matching usage type, but are also associated with a configuration that employs one or more alternate components that are not on the list of unused components in place of (or in addition to) one or more of the current components of the particular storage cluster system. The processor component may then apply actual usage levels of the usage type at which trouble events have actually occurred or predicted usage levels of the usage type at which trouble events are predicted to occur to each of such retrieved models to attempt to identify one or more of such alternate components that may be used in place of or in addition to one or more current components of the particular storage cluster system to resolve such trouble events. If one or more of such alternate components are identified at 2260, then an indication to use the one or more alternate components may be transmitted to an administrator device at 2262. As previously discussed, such a recommendation may serve as a recommendation for the operator of the particular storage cluster system to buy the one or more alternate components to be incorporated into the particular storage cluster system as a solution to the trouble events.

However, if none of the alternate components are identified as resolving the actual or predicted trouble events, then at 2264, the processor component may transmit an indication to an administrator device of a possible need to develop a resolution for the actual or predicted trouble events, as it appears that there may not already be a known resolution.

Figure 8:
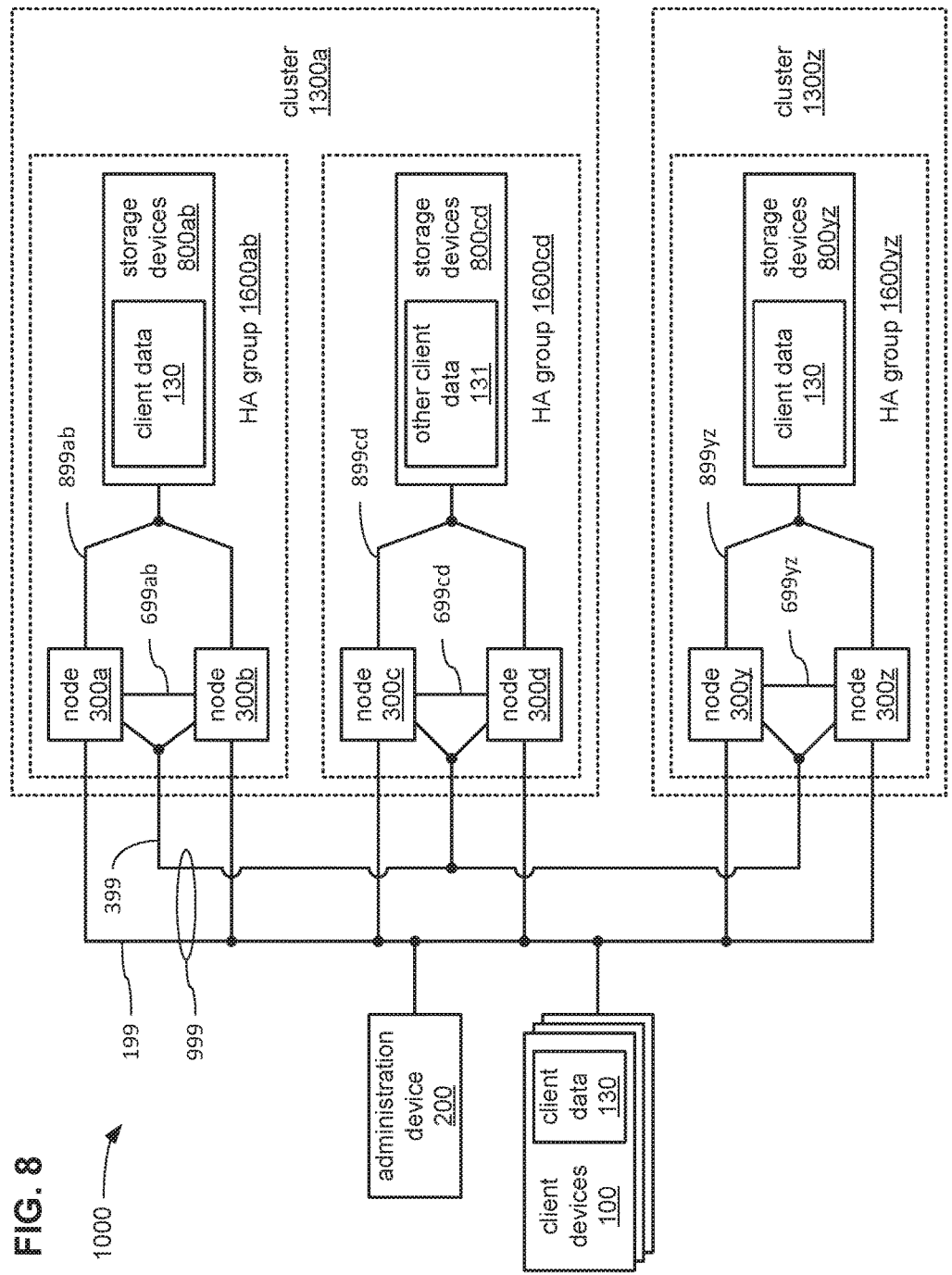
FIG. 8 illustrates an example embodiment of a storage cluster system.

FIG. 8 illustrates a block diagram of an example embodiment of the storage cluster system 1000 incorporating the one or more client devices 100, the one or more administration devices 200, and/or the one or more clusters 1300, such as the depicted clusters 1300a and 1300z. As depicted, the cluster 1300a may incorporate one or more of the nodes 300, such as the depicted nodes 300a-d, and one or more of the storage devices 800, such as the depicted sets of storage devices 800ab and 800cd. As also depicted, the cluster 1300z may incorporate more of the nodes 300, such as the depicted nodes 300y-z, and more of the storage devices 800, such as the depicted sets of storage devices 800yz. As further depicted, the cluster 1300a may include a HA group 1600ab incorporating the nodes 300a-b as partners and the set of storage devices 800ab. The cluster 1300a may also include a HA group 1600cd incorporating the nodes 300c-d as partners and the set of storage devices 800cd. Correspondingly, the cluster 1300z may include a HA group 1600yz incorporating the nodes 300y-z as partners and the set of storage devices 800yz. It should be noted that within the storage cluster system 1000, each of the clusters 1300a and 1300z is an instance of a cluster 1300, each of the sets of storage devices 800ab, 800cd and 800yz represents one or more instances of a storage device 800, and each of the nodes 300a-d and 300y-z is an instance of the node 300 as earlier depicted and discussed in reference to FIGS. 1, 2a and 2b.

In some embodiments, the clusters 1300a and 1300z may be positioned at geographically distant locations to enable a degree of redundancy in storing and retrieving client data 130 provided by one or more of the client devices 100 for storage. Such positioning may be deemed desirable to enable continued access to the client data 130 by one or more of the client devices 100 and/or the administration device 200 despite a failure or other event that may render one or the other of the clusters 1300a or 1300z inaccessible thereto. As depicted, one or both of the clusters 1300a and 1300z may additionally store other client data 131 that may be entirely unrelated to the client data 130.

The formation of the HA group 1600ab with at least the two nodes 300a and 300b partnered to share access to the set of storage devices 800ab may enable a degree of fault tolerance in accessing the client data 130 as stored within the set of storage devices 800ab by enabling one of the nodes 300a-b in an inactive state to take over for its partner in an active state (e.g., the other of the nodes 300a-b) in response to an error condition within that active one of the nodes 300a-b. Correspondingly, the formation of the HA group 1600yz with at least the two nodes 300y and 300z partnered to share access to the set of storage devices 800yz may similarly enable a degree of fault tolerance in accessing the client data 130 as stored within the set of storage devices 800yz by similarly enabling one of the nodes 300y-z in an inactive state to similarly take over for its partner in active state (e.g., the other of the nodes 300y-z).

As depicted, any active one of the nodes 300a-d and 300y-z may be made accessible to the client devices 100 and/or the administration device 200 via a client interconnect 199. As also depicted, the nodes 300a-d and 300y-z may be additionally coupled via an inter-cluster interconnect 399. In some embodiments, the interconnects 199 and 399 may both extend through the same network 999. Each of the interconnects 199 and 399 may be implemented as virtual private networks (VPNs) defined using any of a variety of network security protocols through the network 999. Again, the network 999 may be a single network limited to extending within a single building or other relatively limited area, may include a combination of connected networks extending a considerable distance, and/or may include the Internet. As an alternative to coexisting within the same network 999, the interconnects 199 and 399 may be implemented as entirely physically separate networks. By way of example, the client interconnect 199 may extend through the Internet to enable the client devices 100 and/or the administration device 200 to be positioned at geographically diverse locations, while the inter-cluster interconnect 399 may extend through a leased line between the two geographically distant locations at which each of the clusters 1300a and 1300z are positioned.

As depicted, the partnered nodes within each of the HA groups 1600ab, 1600cd and 1600yz may be additionally coupled via HA interconnects 699ab, 699cd and 699yz, respectively. As also depicted, the nodes within each of the HA groups 1600ab, 1600cd and 1600yz may be coupled to the sets of storage devices 800ab, 800cd and 800yz in a manner enabling shared access via storage interconnects 899ab, 899cd and 899yz, respectively. The partnered nodes and set of storage devices making up each of the HA groups 1600ab, 1600cd and 1600yz may be positioned within relatively close physical proximity to each other such that the interconnects 699ab, 899ab, 699cd, 899cd, 699yz and 899yz may each traverse a relatively short distance (e.g., extending within a room and/or within a cabinet).

More broadly, one or more of the interconnects 199, 399, 699ab, 699cd and 699yz may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Each of the interconnects 899ab, 899cd and 899yz may be based on any of a variety of widely known and used storage interface standards, including and not limited to, SCSI, serially-attached SCSI (SAS), Fibre Channel, etc.

It should be noted that despite the depiction of specific quantities of clusters and nodes within the storage cluster system 1000, other embodiments are possible that incorporate different quantities of clusters and nodes. Similarly, despite the depiction of specific quantities of HA groups and nodes within each of the clusters 1300a and 1300z, other embodiments are possible that incorporate differing quantities of HA groups and nodes. Further, although each of the HA groups 1600ab, 1600cd and 1600yz is depicted as incorporating a pair of nodes 300a-b, 300c-d and 300y-z, respectively, other embodiments are possible in which one or more of the HA groups 1600ab, 1600cd and 1600yz may incorporate more than two nodes.

Figure 9A:
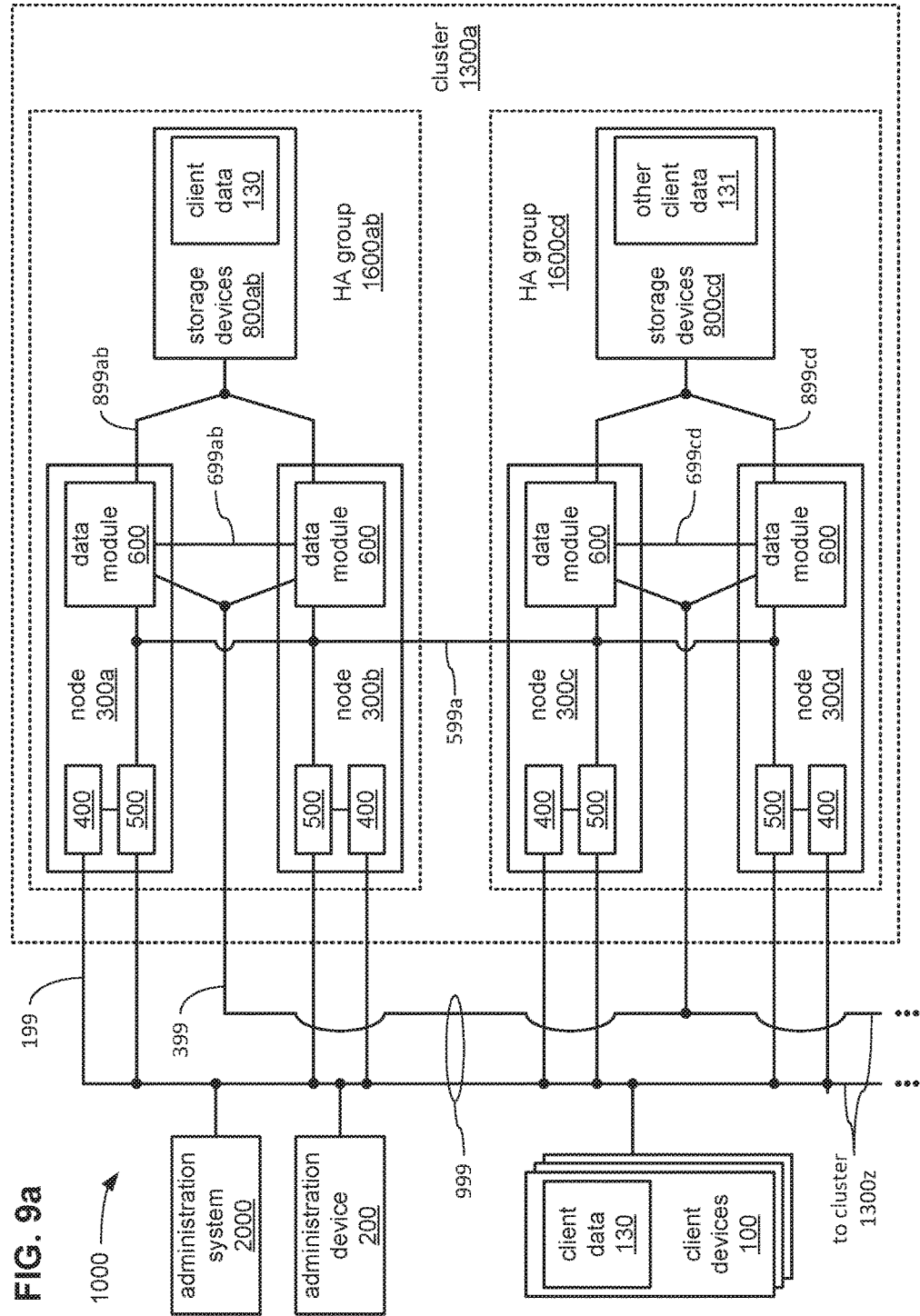
FIG. 9a illustrates an example embodiment of a pair of high availability groups of a cluster.
Figure 9B:
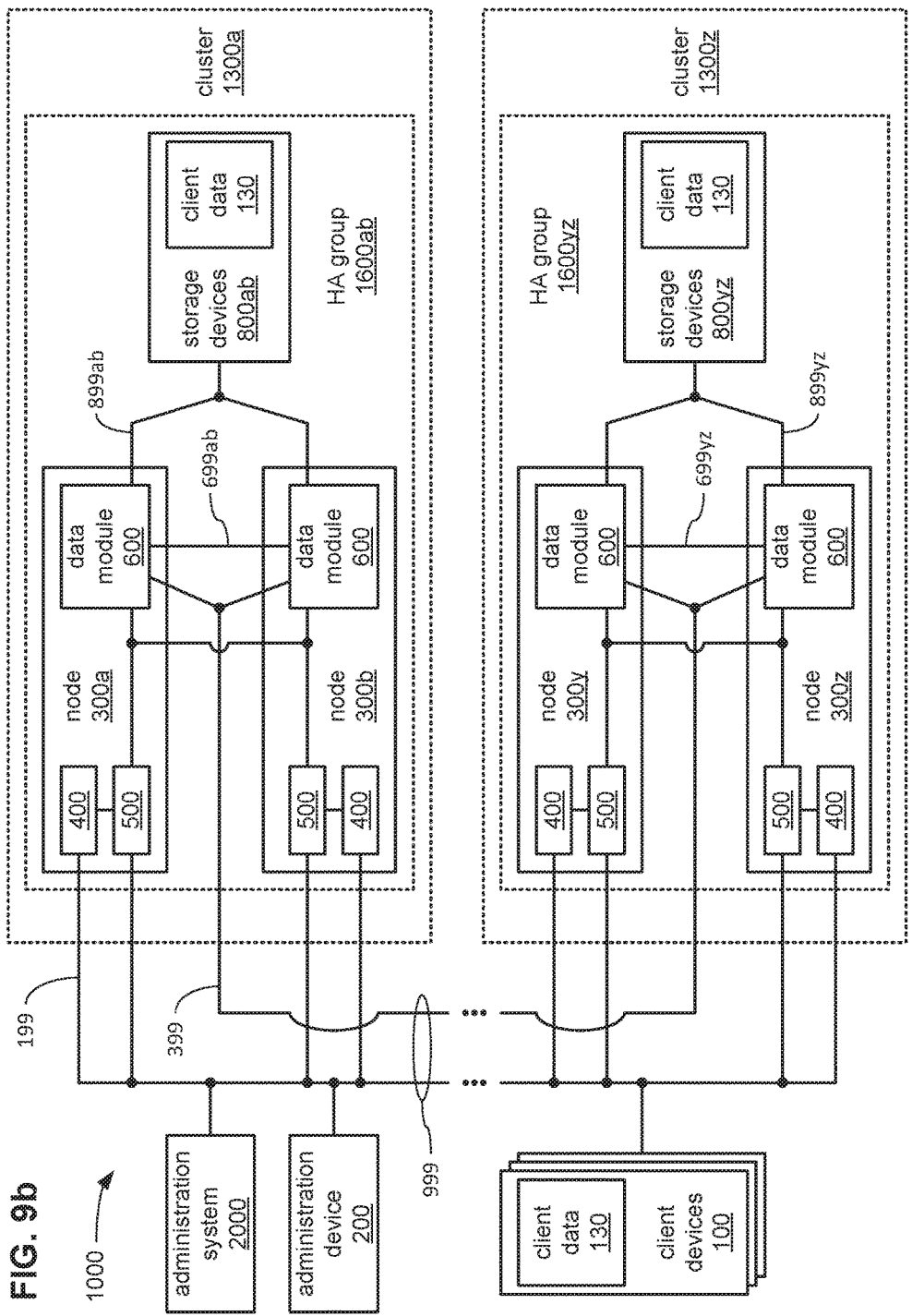
FIG. 9b illustrates an example embodiment of a pair of high availability groups of different clusters.

FIGS. 9a and 9b each illustrate a block diagram of an example portion of the embodiment of the storage cluster system 1000 of FIG. 8 in greater detail. More specifically, FIG. 9a depicts aspects of the nodes 300a-d and interconnections thereamong within the cluster 1300a in greater detail. FIG. 9b depicts aspects of the interconnections among the nodes 300a-b and 300y-z, including interconnections extending between the clusters 1300a and 1300z, in greater detail.

Referring to both FIGS. 9a and 9b, each of the nodes 300a-d and 300y-z may incorporate one or more of a Managing module 400, a Network module 500 and a Data module 600. As depicted, each of the Managing modules 400 and the Network modules 500 may be coupled to the client interconnect 199, by which each may be accessible to one or more of the client devices 100, the administration device 200, and/or to the administration system 2000. The Managing module 400 of one or more active ones of the nodes 300a-d and 300y-z may cooperate with the administration device 200 via the client interconnect 199 to allow an operator of the administration device 200 to configure various aspects of the manner in which the storage cluster system 1000 stores and provides access to the client data 130 provided by one or more of the client devices 100. That same Managing module 400 may also recurringly transmit indications of that configuration and other information concerning the storage cluster system 1000 to the collection server 2400 of the administration system 2000. The Network module 500 of one or more active ones of the nodes 300a-d and 300y-z may receive and respond to requests for storage services received from one or more of the client devices 100 via the client interconnect 199, and may perform a protocol conversion to translate each storage service request into one or more data access commands.

As depicted, the Data modules 600 of all of the nodes 300a-d and 300y-z may be coupled to each other via the inter-cluster interconnect 399. Also, within each of the HA groups 1600ab, 1600cd and 1600yz, Data modules 600 of partnered nodes may share couplings to the sets of storage devices 800ab, 800cd and 800yz, respectively. More specifically, the Data modules 600 of the partnered nodes 300a and 300b may both be coupled to the set of storage devices 800ab via the storage interconnect 899ab, the Data modules 600 of the partnered nodes 300c and 300d may both be coupled to the set of storage devices 800cd via the storage interconnect 899cd, and the Data modules 600 of the partnered nodes 300y and 300z may both be coupled to the set of storage devices 800yz via the storage interconnect 899yz. The Data modules 600 of active ones of the nodes 300a-d and 300y-z may perform the data access commands derived by one or more of the Network modules 500 of these nodes from translating storage service requests received from one or more of the client devices 100.

Thus, the Data modules 600 of active ones of the nodes 300a-d and 300y-z may access corresponding ones of the sets of storage devices 800ab, 800cd and 800yz via corresponding ones of the storage interconnects 899ab, 899cd and 899yz to store and/or retrieve client data 130 as part of performing the data access commands. The data access commands may be accompanied by portions of the client data 130 to store and/or newer portions of the client data 130 with which to update the client data 130 as stored. Alternatively or additionally, the data access commands may specify portions of the client data 130 to be retrieved from storage for provision back to one or more of the client devices 100.

Further, and referring to FIG. 9b, the Data module 600 of an active one of the nodes 300a-b and 300y-z of one of the clusters 1300a or 1300z may replicate the data access commands and transmit the resulting replica data access commands via the inter-cluster interconnect 399 to another active one of the nodes 300a-b and 300y-z of the other of the clusters 1300a or 1300z to enable at least partial parallel performance of the data access commands by two of the Data modules 600. In this way, the state of the client data 130 as stored within one of the sets of storage devices 800ab or 800yz may be mirrored within the other of the sets of storage devices 800ab or 800yz, as depicted.

Such mirroring of the state of the client data 130 between multiple sets of storage devices associated with different clusters that may be geographically distant from each other may be deemed desirable to address the possibility of the nodes of one of the clusters becoming inaccessible as a result of a regional failure of the client interconnect 199 (e.g., as a result of a failure of a portion of the network 999 through which a portion of the client interconnect extends in a particular geographic region). As familiar to those skilled in the art, the use of additional interconnect(s) between partnered nodes of a HA group (e.g., the HA interconnects 699ab, 699cd and 699yz) tends to encourage physically locating partnered nodes of a HA group in close proximity to each other such that a localized failure of a network may render all nodes of a HA group inaccessible to the client devices 100. For example, a failure of a portion of a network that includes the client interconnect 199 in the vicinity of both of the nodes 300a and 300b may render both of the nodes 300a and 300b inaccessible to the client devices 100 such that the client data 130 stored within the sets of storage devices 800ab becomes inaccessible through either of the nodes 300a or 300b. With both of the sets of the storage devices 800ab and 800yz mirroring the state of the client data 130, the client devices 100 are still able to access the client data 130 within the set of storage devices 800yz, despite the loss of access to the set of storage devices 800ab.

Referring again to both FIGS. 9a and 9b, and as previously discussed, the sharing of access via the storage interconnects 899ab, 899cd and 899yz to each of the sets of storage devices 800ab, 800cd and 800yz, respectively, among partnered ones of the nodes 300a-d and 300y-z may enable continued access to one of the sets of storage devices 800ab, 800cd and 800yz in the event of a failure occurring within one of the nodes 300a-d and 300y-z. The coupling of Data modules 600 of partnered ones of the nodes 300a-d and 300y-z within each of the HA groups 1600ab, 1600cd and 1600yz via the HA interconnects 699ab, 699cd and 699yz, respectively, may enable such continued access in spite of such a failure. Through the HA interconnects 699ab, 699cd or 699yz, Data modules 600 of each of these nodes may each monitor the status of the Data modules 600 their partners. More specifically, the Data modules 600 of the partnered nodes 300a and 300b may monitor each other through the HA interconnect 699ab, the Data modules 600 of the partnered nodes 300c and 300d may monitor each other through the HA interconnect 699cd, and the Data modules 600 of the partnered nodes 300y and 300z may monitor each other through the HA interconnect 699yz.

Such monitoring may entail recurring exchanges of "heartbeat" and/or other status signals (e.g., messages conveying the current state of performance of a data access command) via one or more of the HA interconnects 699ab, 699cd or 699yz in which an instance of an absence of receipt of such a signal within a specified recurring interval may be taken as an indication of a failure of the one of the Data modules 600 from which the signal was expected. Alternatively or additionally, such monitoring may entail awaiting an indication from a monitored one of the Data modules 600 that a failure of another component of one of the nodes 300a-d or 300y-z has occurred, such as a failure of a Managing module 400 and/or of a Network module 500 of that one of the nodes 300a-d or 300y-z. In response to such an indication of failure of an active one of the nodes 300a-d or 300y-z belonging to one of the HA groups 1600ab, 1600cd or 1600yz, an inactive partner among the nodes 300a-d or 300y-z of the same one of the HA groups 1600ab, 1600cd or 1600yz may take over. Such a "takeover" between partnered ones of the nodes 300a-d or 300y-z may be a complete takeover inasmuch as the partner that is taking over may take over performance of all of the functions that were performed by the failing one of these nodes.

However, in some embodiments, at least the Network modules 500 and the Data modules 600 of multiple ones of the nodes 300a-d and/or 300y-z may be interconnected in a manner enabling a partial takeover in response to the failure of a portion of one of the nodes 300a-d or 300y-z. Referring more specifically to FIG. 9a, the Network modules 500 of each of the nodes 300a-d may be coupled to the Data modules 600 of each of the nodes 300a-d via an intra-cluster interconnect 599a. In other words, within the cluster 1300a, all of the Network modules 500 and all of the Data modules 600 may be coupled to enable data access commands to be exchanged between Network modules 500 and Data modules 600 of different ones of the nodes 300a-d. Thus, by way of example, where the Network module 500 of the node 300a has failed, but the Data module 600 of the node 300a is still operable, the Network module 500 of its partner node 300b (or of one of the nodes 300c or 300d with which the node 300a is not partnered in a HA group) may take over for the Network module 500 of the node 300a.

Although the clusters 1300a and 1300z may be geographically distant from each other, within each of the clusters 1300a and 1300z, nodes and/or components of nodes may be positioned within relatively close physical proximity to each other such that the intra-cluster interconnects 599a and 599z may each traverse a relatively short distance (e.g., extending within a room and/or within a single cabinet). More broadly, one or more of the intra-cluster interconnects 599a and 599z may be based on any of a variety (or combination) of communications technologies by which signals may be exchanged, including without limitation, wired technologies employing electrically and/or optically conductive cabling, and wireless technologies employing infrared, radio frequency or other forms of wireless transmission. By way of example, the intra-cluster interconnect 599a may be made up of a mesh of point-to-point interconnects coupling each Network module 500 of each of the nodes 300a-d to each Data module 600 of each of the nodes 300a-d. Alternatively, by way of another example, the intra-cluster interconnect 599a may include a network switch (not shown) to which each of the Network modules 500 and each of the Data modules 600 of the nodes 300a-d may be coupled.

The Managing module 400 of one or more of the active ones of the nodes 300a-d and 300y-z may recurringly retrieve indications of status from the Network modules 500 and/or Data modules 600 within the same node and/or from others of the nodes 300a-d and 300y-z. Where necessary, such a Managing module 400 may indirectly retrieve such information from one or more Network modules 500 and/or Data modules 600 through one or more other Managing modules 400. Among such retrieved indications may be indications of a failure in a Network module 500 and/or a Data module 600, and such a failure may have prompted a partial or a complete takeover by one of the nodes 300a-d and 300y-z of functions performed by another of the nodes 300a-d and 300y-z. Correspondingly, following a repair or other correction to address such a failure, the retrieved indications may include an indication of a "give-back" event in which a partial or complete takeover is reversed. In some embodiments, a Managing module 400 that recurringly retrieves such indications of status may recurringly transmit those indications to the collection server 2400 of the administration system 2000. Alternatively or additionally, that Managing module 400 may generate a summary or other form of aggregation of such events as takeovers and give-backs to transmit to the collection server 2400.

It should also be noted that despite the depiction of only a single one of each of the Managing module 400, the Network module 500 and the Data module 600 within each of the nodes 300a-d and 300y-z, other embodiments are possible that may incorporate different quantities of one or more of the Managing module 400, the Network module 500 and the Data module 600 within one or more of these nodes. By way of example, embodiments are possible in which one or more of the nodes 300a-d and/or 300y-z incorporate more than one Network module 500 to provide a degree of fault-tolerance within a node for communications with one or more of the client devices 100, and/or incorporate more than one Data module 600 to provide a degree of fault-tolerance within a node for accessing a corresponding one of the sets of storage devices 800ab, 800cd or 800yz.

Figure 10:
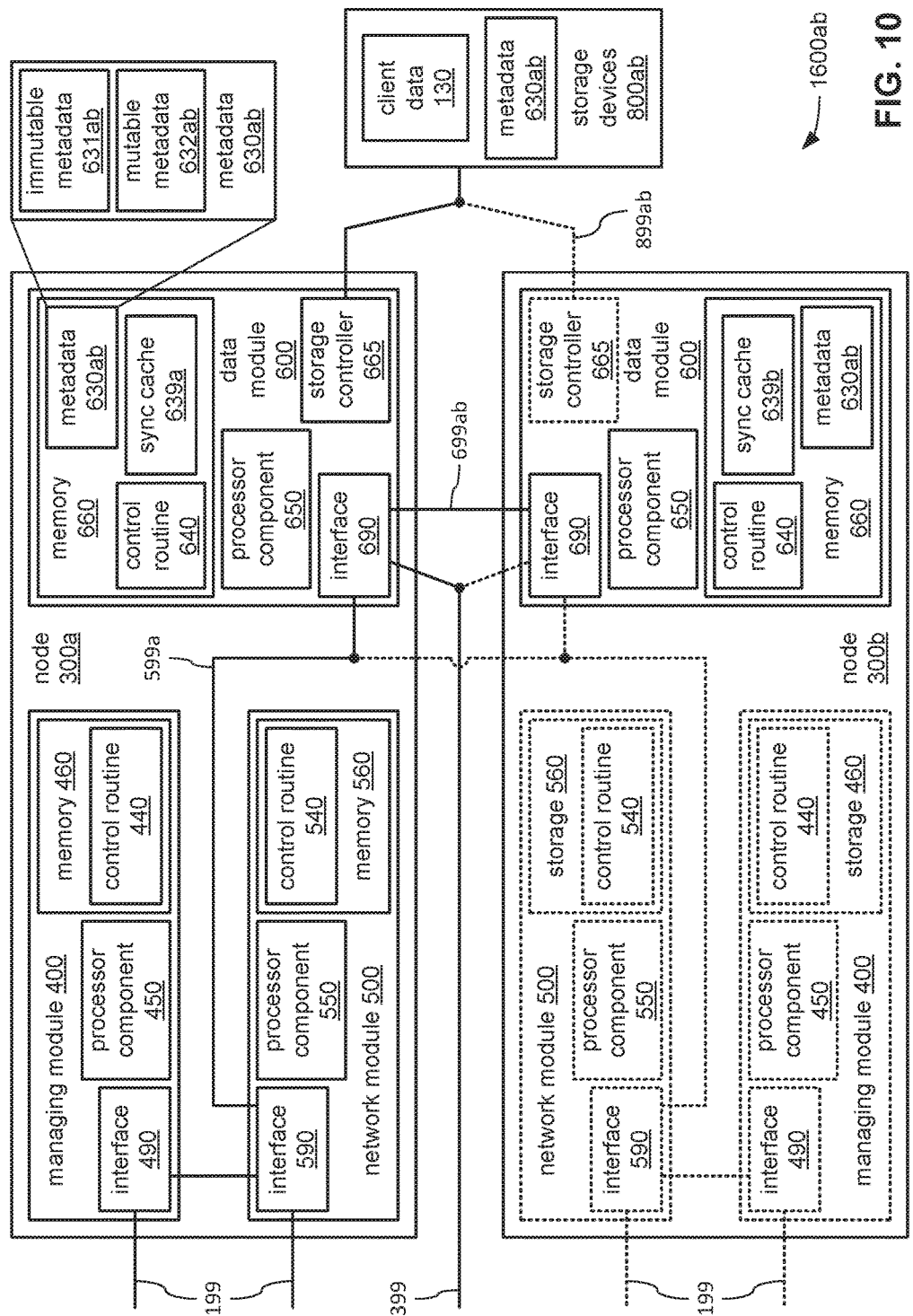
FIG. 10 illustrates an example embodiment of a HA group of partnered nodes.

FIG. 10 illustrates a block diagram of an example embodiment of the HA group 1600ab of the cluster 1300a of the embodiment of the storage cluster system 1000 of FIG. 8 in greater detail. As depicted, of the nodes 300a and 300b of the HA group 1600ab, the node 300a may be active to engage in communications with a client device 100 and/or the administration device 200, and may be active to perform operations altering the client data 130 within the set of storage devices 800ab, while the node 300b may be inactive and awaiting a need to take over for the node 300a. More specifically, the Managing module 400 and the Network module 500 of the node 300a may engage in communications with the client devices 100, the administration device 200 and/or the collection server 2400 of the administration system 2000 (as indicated with the Managing module 400 and the Network module 500 of the node 300a being drawn with solid lines), while the Managing module 400 and the Network module 500 of the node 300b may not (as indicated with the Managing module 400 and the Network module 500 being drawn with dotted lines).

In various embodiments, the Managing module 400 of each of the nodes 300a-b incorporates one or more of a processor component 450, a memory 460 and an interface 490 to couple the Managing module 400 to at least the client interconnect 199. The memory 460 may store a control routine 440. The control routine 440 may incorporate a sequence of instructions operative on the processor component 450 in its role as a main processor component of the Managing module 400 to implement logic to perform various functions. As a result of the node 300a being active to engage in communications with one or more of the client devices 100 and/or the administration device 200, the processor component 450 of the Managing module 400 of the node 300a may be active to execute the control routine 440. In contrast, as a result of the node 300b being inactive, the processor component 450 may not be active to execute the control routine 440 within the Managing module 400 of the node 300b. However, if the node 300b takes over for the node 300*a*, then the control routine 440 within the node 300*b* may begin to be executed, while the control routine 440 within the node 300*a* may cease to be executed.

In executing the control routine 440, the processor component 450 of the Managing module 400 of the active node 300*a* may operate the interface 490 to accept remotely supplied configuration data. In some embodiments, such remote configuration data may emanate from the administration device 200. By way of example, which one(s) of the nodes 300*b-d* or 300*y-z* may be partnered to form one or more HA groups (e.g., the HA groups 1600*ab*, 1600*cd* or 1600*yz*) may be remotely configured, as well as what nodes and/or HA groups may cooperate to provide further fault tolerance (e.g., geographically dispersed fault tolerance), what network addresses may be allocated to one or more of the nodes 300*a-d* and/or 300*y-z* on various interconnects, etc. In other embodiments, such remote configuration may emanate from one or more of the client devices 100. The processor component 450 may provide a web server, telnet access, instant messaging and/or other communications service(s) by which such aspects of operation may be remotely configured from the administration device 200 or one or more of the client devices 100 via the client interconnect 199. Regardless of the exact manner in which configuration information is remotely provided, as the processor component 450 receives such configuration information and/or subsequent to receiving such information, the processor component 450 may operate the interface 490 to relay it and/or updates thereto to the Network module 500 and/or the Data module 600 as a portion of metadata. Alternatively or additionally, the processor component 450 may also operate the interface 490 to relay such configuration information and/or updates thereto to the collection server 2400 of the administration system 2000.

In various embodiments, the Network module 500 of each of the nodes 300*a-b* incorporates one or more of a processor component 550, a memory 560 and an interface 590 to couple the Network module 500 to one or both of the client interconnect 199 and the intra-cluster interconnect 599*a*. The memory 560 may store a control routine 540. The control routine 540 may incorporate a sequence of instructions operative on the processor component 550 in its role as a main processor component of the Network module 500 to implement logic to perform various functions. As a result of the node 300*a* being active to engage in communications with one or more of the client devices 100 and to perform data access commands, the processor component 550 of the Network module 500 of the node 300*a* may be active to execute the control routine 540. In contrast, as a result of the node 300*b* being inactive, the processor component 550 may not be active to execute the control routine 540 within the N-module of the node 300*b*. However, if the node 300*b* takes over for the node 300*a*, then the control routine 540 within the node 300*b* may begin to be executed, while the control routine 540 within the node 300*a* may cease to be executed.

In executing the control routine 540, the processor component 550 of the Network module 500 of the active node 300*a* may operate the interface 590 to perform various tests to detect other devices with which to communicate and/or assign network addresses by which other devices may be contacted for communication. At least as part of rebooting following being reset or powered on, the processor component 550 may perform various tests on the client interconnect 199 and/or the intra-cluster interconnect 599*a* to determine addresses and/or communications protocols for communicating with one or more components (e.g., Managing modules 400, Network modules 500 and/or Data modules 600) of one or more of the nodes 300*a-d* and/or 300*y-z*. Alternatively or additionally, in embodiments in which at least a portion of the intra-cluster interconnect 599*a* supports internet protocol (IP) addressing, the processor component 550 may function in the role of a dynamic host control protocol (DHCP) server to assign such addresses. Also alternatively or additionally, the processor component 550 may receive configuration information from the Managing module 400 (e.g., a portion of metadata).

In some embodiments, configuration information received from the Managing module 400 may be employed by the processor component 550 in performing such tests on the client interconnect 199 and/or the intra-cluster interconnect 599*a* (e.g., the configuration information so received may include a range of IP addresses to be tested). As the processor component 550 performs such tests and/or subsequent to performing such tests, the processor component 550 may operate the interface 590 to relay indications of the results of those tests and/or updates thereto to the Data module 600 as a portion of metadata. Further, as the processor component 550 interacts with one or more of the client devices 100 and/or other devices, the processor component 550 may detect changes in information determined from the performance of various tests, and may operate the interface 590 to provide indications of those changes to the Data module 600 as portions of updated metadata.

In some embodiments, as the processor component 550 of each Network module 500 that performs such tests, those processor components 550 may also operate their respective interfaces 590 to relay the results of those tests and/or updates thereto to the Managing module 400 that is in communication with the collection server 2400, either directly thereto, or through another intervening Managing module 400. The Managing module 400 in communication with the collection server 2400 may also transmit a copy of the portions of metadata as originally generated and as updated by the results of those tests. Differences in the portions of metadata preceding and following such updates may provide an indication to be stored by the collection server 2400 of an attempt to configure the storage cluster system 1000 that is being defeated by a condition affecting a portion of an interconnect and/or another factor.

In further executing the control routine 540, the processor component 550 may operate the interface 590 to exchange storage service requests, responses thereto and/or client data 130 with one or more of the client devices 100 via the client interconnect 199. The client devices 100 and the Network module(s) 500 of one or more active ones of the nodes 300*a-d* and 300*y-z* may interact with each other via the client interconnect 199 in accordance with a client/server model for the handling of client data 130. Stated differently, each of the client devices 100 may issue requests for storage services related to the storage of client data 130 to one or more of the nodes 300*a-d* and 300*y-z* that are active to engage in communications with the client devices 100. In so doing, the client devices 100 and the Network module 500 may exchange packets over the client interconnect 199 in which storage service requests may be transmitted to the Network module 500, responses (e.g., indications of status of handling of the requests) may be transmitted to the client devices 100, and client data 130 may be exchanged therebetween. The exchanged packets may utilize any of a variety of file-based access protocols, including and not limited to, Common Internet File System (CIFS) protocol or Network File System (NFS) protocol, over TCP/IP. Alternatively or additionally, the exchanged packets may utilize any of a variety of block-based access protocols, including and not limited to, Small Computer Systems Interface (SCSI) protocol encapsulated over TCP (iSCSI) and/or SCSI encapsulated over Fibre Channel (FCP).

Also in executing the control routine 540, the processor component 550 may operate the interface 590 to exchange commands and/or data, including client data 130, with the Data module 600 via the intra-cluster interconnect 599a. Such exchanges of commands and/or data may or may not employ a protocol in which packets are used. In some embodiments, data access commands to effect exchanges of client data 130 may be exchanged through the intra-cluster interconnect 599a in a manner that may be agnostic of any particular file system that may be selected for use in storing the client data 130 within the set of storage devices 800ab. More specifically, the manner in which portions of client data 130 may be referred to in data access commands to store and/or retrieve client data 130 may entail identification of file names, identification of block identifiers, etc. in a manner meant to be independent of a selection of a file system.

Given the possible differences in protocols and/or other aspects of communications, the processor component 550 may be caused to translate between protocols employed in communications with one or more of the client devices 100 via the client interconnect 199 and protocols employed in communications with the Data module 600 via the intra-cluster interconnect 599a. Alternatively or additionally, one or more of the protocols employed in communications via the client interconnect 199 may employ file and/or block identification in a manner enabling a minimal degree of protocol translation between such communications and communications via the intra-cluster interconnect 599a.

In performing such protocol translations, the processor component 550 may be caused to relay a storage service request from one of the client devices 100 to the Data module 600 as one or more data access commands to store and/or retrieve client data 130. More specifically, a request received via the client interconnect 199 for storage services to retrieve client data 130 may be converted into one or more data access commands conveyed to the Data module 600 via the intra-cluster interconnect 599a to retrieve client data 130 from the set of storage devices 800ab and to provide the client data 130 to the Network module 500 to be relayed by the Network module 500 back to the requesting one of the client devices 100. Also, a request received via the client interconnect 199 for storage services to store client data 130 may be converted into one or more data access commands conveyed to the Data module 600 via the intra-cluster interconnect 599a to store the client data 130 within the set of storage devices 800ab.

In various embodiments, the Data module 600 of each of the nodes 300a-b incorporates one or more of a processor component 650, a memory 660, a storage controller 665 to couple the Data module 600 to the set of storage devices 800ab via the storage interconnect 899ab, and an interface 690 to couple the Data module 600 to one or more of the intra-cluster interconnect 599a, the inter-cluster interconnect 399 and the HA interconnect 699ab. The memory 660 stores one or more of a control routine 640 and metadata 630ab. Also, and as will be explained in greater detail, in the Data module 600 of the node 300a, a portion of the memory 660 may be allocated to serve as a synchronization cache (sync cache) 639a, while a portion of the memory 660 may be similarly allocated to serve as a sync cache 639b in the D-module of the node 300b. The control routine 640 incorporates a sequence of instructions operative on the processor component 650 in its role as a main processor component of the Data module 600 to implement logic to perform various functions. However, as a result of the node 300a being active to engage in communications with one or more of the client devices 100 and to perform data access commands, a different portion of the control routine 640 may be executed by the processor component 650 of the Data module 600 of the node 300a from a portion of the control routine 640 that may be executed by the processor component 650 of the D-module of the node 300b. As a result, different logic may be implemented by the executions of different portions of the control routine 640 within each of these Data modules 600.

In executing the control routine 640, the processor component 650 of the Data module 600 of the active node 300a may operate the interface 690 to receive portions of metadata and/or updates thereto from the Managing module 400 and/or the Network module 500 via the intra-cluster interconnect 599a. Regardless of whether aspects of the operation of at least the node 300a are remotely configured via the Managing module 400 and/or are configured based on the results of tests performed by the Network module 500, the processor component 650 may generate the metadata 630ab from those received metadata portions indicating the resulting configuration of those aspects, and may store the metadata 630ab within the memory 660 for subsequent use by the processor component 650. The processor component 650 may repeat the generation of the metadata 630ab in response to receiving updated portion(s) of metadata from the Managing module 400, the Network module 500 and/or other possible sources of updated metadata portions, thereby creating an updated version of the metadata 630ab which the processor component 650 may store within the memory 660 in place of earlier version(s). Following generation of the metadata 630ab and/or each updated version thereof, the processor component 650 may store the metadata 630ab within the set of storage devices 800ab for later retrieval during a subsequent rebooting of at least the Data module 600 of the node 300a.

Also following generation of the metadata 630ab and/or each updated version thereof, the processor component 650 of the Data module 600 of the node 300a may operate the interface 690 to transmit a duplicate of the metadata 630ab to the Data module 600 of the inactive node 300b via the HA interconnect 699ab to enable the node 300b to more speedily take over for the active node 300a in response to a failure within the node 300a. In this way, the node 300b is directly provided with the metadata 630ab and/or updated versions thereof to provide information needed by the node 300b to more readily take over communications with one or more client devices, take over communications with one or more others of the nodes 300c-d and/or 300y-z, and/or take over control of and/or access to the set of storage devices 800ab.

Still further following generation of the metadata 630ab and/or each updated version thereof, the processor component 650 of the Data module 600 of the node 300a may operate the interface 690 to transmit a portion of the metadata 630ab to the Data module 600 of an active one of the nodes 300y-z of the HA group 1600yz of the other cluster 1300z. Alternatively or additionally, the processor component 650 of the Data module 600 of the node 300a may operate the interface 690 to transmit metadata portion(s) received from the Managing module 400 and/or the Network module 500 of the node 300a to the active one of the nodes 300y-z. Such metadata portion(s) may include indications of aspects of operation of all of the nodes 300a-b and 300y-z together in storing and/or providing access to the client data 130, and may be provided to the active one of the nodes 300*y-z* as an input to other metadata that may be separately generated and/or maintained by the nodes 300*y-z*.

In some embodiments, as the processor component 650 of at least the Data module 600 receives metadata portions (or updates thereto) and generates each new version of the metadata 630*ab*, the processor component 650 may operate the interface 690 to relay each new version of the metadata 630*ab* to the Managing module 400 that is in communication with the collection server 2400 of the administration system 2000 through one or more Network modules 500. As previously discussed, the Managing module 400 in communication with the collection server 2400 may also transmit a copies of the portions of metadata from which the metadata 630*ab* is derived, and in so doing, may transmit a copy of the metadata 630*ab* with those metadata portions.

In further executing the control routine 640, the processor component 650 of the Data module 600 of the node 300*a* may operate the set of storage devices 800*ab* through the storage controller 665 to store and retrieve client data 130 in response to data access commands to do so received via the intra-cluster interconnect 599*a*, as has been described. The processor component 650 may operate the interface 690 to receive the data access commands from and/or exchange data (including client data 130) with the Network module 500 via the intra-cluster interconnect 599*a*. The processor component 650 may be caused to retry the performance of a data access command to store or retrieve client data 130 at least in response to the occurrence of a short term failure in performance (e.g., a failure that is likely to be resolved relatively quickly). However, if the failure in performance is a longer term failure (e.g., a failure that cannot be resolved quickly and/or requires intervention of personnel), then a takeover may occur in which, for example, the node 300*b* becomes the new active node of the HA group 1600*ab*. In addition to operating the storage controller 665 to execute data access commands to store client data 130 within the set of storage devices 800*ab* and/or retrieve client data 130 therefrom, the processor component 650 of the Data module 600 of the node 300*a* may also replicate the data access commands and operate the interface 690 to transmit the resulting replica data access commands via the inter-cluster interconnect 399 to a Data module 600 of an active one of the nodes 300*y-z* of the HA group 1600*yz* of the other cluster 1300*z*. As has been discussed, the transmission of such replica data access commands to an active node of another HA group may provide an additional degree of fault tolerance in the storage and/or retrieval of client data 130 in which the replica data access commands may be performed by an active node of another cluster at least partly in parallel with the performance of the original data access command by the node 300*a*. The processor component 650 may be caused to retry the transmission of such replica data access commands to either the same active one of the nodes 300*y-z* within the HA group 1600*yz* and/or to a different inactive one of the nodes 300*y-z* within the HA group 1600*yz* in response to indications of errors in either the receipt or performance of the replica data access commands. Retrying transmission of replica data access commands to an inactive one of the nodes 300*y-z* may cause or arise from a takeover of the active one of the nodes 300*y-z* by the inactive one thereof.

In support of such exchanges of replica data access commands and responses thereto between the Data module 600 of the node 300*a* and a Data module 600 of an active one of the nodes 300*y-z*, the processor component 650 of the Data module 600 of the node 300*a* may employ information included within the metadata 630*ab* to form an active communications session with the Data module 600 of that other active node through the inter-cluster interconnect 399. The processor component 650 may additionally form an inactive communications session with a D-module of the inactive one of the nodes 300*y-z* through the inter-cluster interconnect 399 in preparation for retrying a transmission of a replica data access command to the Data module 600 of that inactive node. Further, if the processor component 650 retries the transmission of a replica data access command to the Data module 600 of that inactive one node, then the processor component 650 may act to change the state of the inactive communications session formed with the Data module 600 of that inactive node from inactive to active.

In executing the control routine 640, the processor component 650 of the Data module 600 of the inactive node 300*b* may operate the interface 690 to receive the metadata 630*ab* and/or updates thereto from the Data module 600 of the node 300*a* via the HA interconnect 699*ab*. The processor component 650 may then store the received metadata 630*ab* and/or the received updates thereto within the memory 660 for subsequent use. Again, provision of the metadata 630*ab* and updates thereto directly to the node 300*b* by the node 300*a* may be deemed desirable to enable the node 300*b* to more quickly take over for the node 300*a* (thereby transitioning from being an inactive node of the HA group 1600*ab* to becoming the active node of the HA group 1600*ab*) in response to a failure occurring within the node 300*a*. More specifically, with the metadata 630*ab* already provided to the Data module 600 of the node 300*b*, the need for the processor component 650 of the Data module 600 of the node 300*b* to take additional time to retrieve the metadata 630*ab* from other sources is alleviated. More precisely, the need for the processor component to retrieve the metadata 630*ab* from the set of storage devices 800*ab*, or to request portions of metadata from the Managing module 400 and/or the Network module 500 of either of the nodes 300*a* or 300*b* upon taking over for the node 300*a* is alleviated.

As depicted, the metadata 630*ab* may include immutable metadata 631*ab* and mutable metadata 632*ab*. What pieces of metadata are included in each of the immutable metadata 631*ab* and the mutable metadata 632*ab* may be based on the relative frequency with which each piece of metadata is expected to change. By way of example, aspects of the storage of client data 130 within the set of storage devices 800*ab*, such as a selection of file system, a "level" of redundancy of a Redundant Array of Independent Disks (RAID), etc. may be deemed immutable as a result of being deemed less likely to change or likely to change less frequently than other metadata. In contrast, a network address of a M-module, a N-module or a D-module of one of the other nodes 300*a-d* or 300*y-z* with which the node 300*a* may communicate via one of the interconnects 399, 599*a* or 699*ab* may be deemed mutable as a result of being deemed more likely to change or likely to change more frequently than other metadata.

As part of determining whether one of the nodes 300*a* or 300*b* needs to take over for the other, the processor components 650 of the D-modules of each of the nodes 300*a* and 300*b* may cooperate to recurringly exchange indications of the status of their nodes via the HA interconnect 699*ab* extending therebetween. As previously discussed such exchanges of status indications may take the form of recurring "heartbeat" signals and/or indications of the current state of performing an operation (e.g., a performing a data access command). Again, an indication that a component of one of the nodes 300*a-b* has suffered a malfunction may be the lack of receipt of an expected heartbeat signal or other status indication by the other of the nodes 300a-b within a specified period of time (e.g., within a recurring interval of time). Where the Data module 600 of the active node 300a receives an indication of a failure within the inactive node 300b, the processor component 650 of the Data module 600 of the node 300a (or another component of the node 300a) may refrain from taking action to take over the node 300b, since the node 300b is inactive such that the node 300b may not be performing a task that requires a takeover of the node 300b.

However, where the Data module 600 of the inactive node 300b receives an indication of a failure within the active node 300a, the processor component 650 of the Data module 600 of the inactive node 300b (or another component of the inactive node 300b) may take action to take over the node 300a, since the node 300a is active to engage in communications with the client devices 100, to perform data access commands, and to cooperate with another active node to cause at least partial parallel performance of data access commands therebetween. By way of example, the processor component 650 of the Data module 600 of the node 300b may signal the Network module 500 of the node 300b to take over communications with one or more of the client devices 100 and/or may begin performing the data access commands that were performed by the processor component 650 of the Data module 600 of the node 300a. In taking over the performance of those data access commands, the processor component 650 of the Data module 600 of the node 300b may take over access to and control of the set of storage devices 800ab via the coupling that the Data modules 600 of both of the nodes 300a and 300b share to the set of storage devices 800ab through the storage interconnect 899ab.

Where the inactive node 300b does take over for the active node 300a in response to a failure occurring within the node 300a, the active and inactive roles of the nodes 300a and 300b may fully reverse, at least after the failure within the node 300a has been corrected. More specifically, the Managing module 400 and the Network module 500 of the node 300b may become active to engage in communications with the client devices 100 and/or the administration device 200 via the client interconnect 199 to receive configuration information and storage service requests, and thereby take over for the Managing module 400 and the Network module 500 of the node 300a, while the Managing module 400 and the Network module 500 of the node 300a become inactive. Similarly, the Data module 600 of the node 300b may become active to perform and replicate data access commands, and to transmit replica data access commands to another active node via the inter-cluster interconnect 399 to cause at least partial parallel performance of the data access commands, and thereby take over for the Data module 600 of the node 300a, while the Data module 600 of the node 300a becomes inactive. However, in becoming active, the processor component 650 of the Data module 600 of the now inactive node 300a may cooperate with the processor component 650 of the Data module 600 of the node 300b to receive new versions of the metadata 630ab generated within the node 300b and to exchange indications of status with the Data module 600 of the node 300b via the HA interconnect 699ab to determine if the node 300a should subsequently take over for the now active node 300b.

The processor components 650 of the Data modules 600 of each of the nodes 300a and 300b may designate or otherwise use a portion of corresponding ones of the memories 660 as the sync caches 639a and 639b, respectively, in communications with Data module(s) 600 of others of the nodes 300a-d and/or 300y-z. More specifically, the processor components 650 of the Data modules 600 of the nodes 300a and 300b may employ the sync caches 639a and 639b, respectively, to buffer versions of the metadata 630ab and/or status indications exchanged therebetween. Alternatively or additionally, the processor component 650 of the Data module 600 of the node 300a may maintain and employ the sync cache 639a to buffer replica data access commands transmitted to another active node of another HA pair of another cluster and/or indications of status of performance of those replica data access commands received from that other active node.

As the processor components 550 of Network modules 500 and the processor components 650 of Data modules 600 within active ones of the nodes 300a-d and 300y-z execute relevant portions of the control routines 540 and 640, respectively, to handle requests for storages services received from one or more of the client devices 100, each of those processor components 550 and 650 may monitor various aspects of the performance and usage of the storage cluster system 1000. By way of example, each of such processor components 550 may monitor the rates at which requests for storage services are received and relayed, the amount of time required to do so, the rate of throughput of client data 130 exchanged through active ones of the Network modules 500, and any instances in which a specified maximum or other high rate of throughput of client data 130 is reached or exceeded. Also by way of example, each of such processor components 650 may monitor the quantities of client data 130 stored within and/or amounts of storage capacity still available within associated ones of the sets of storage devices 800ab, 800cd and/or 800yz, data rates at which client data 130 is stored or retrieved, and any instances in which an access to one or more storage devices needed to be retried. Such processor components 550 and 650 may operate corresponding ones of the interfaces 590 and 690, respectively, to relay such information to the Managing module 400 that is in communication with the collection server 2400, either directly thereto or through another intervening Managing module 400. The one of the Managing modules 400 in communication with the collection server 2400 may, in turn, relay such information to the collection server 2400.

Figure 11:
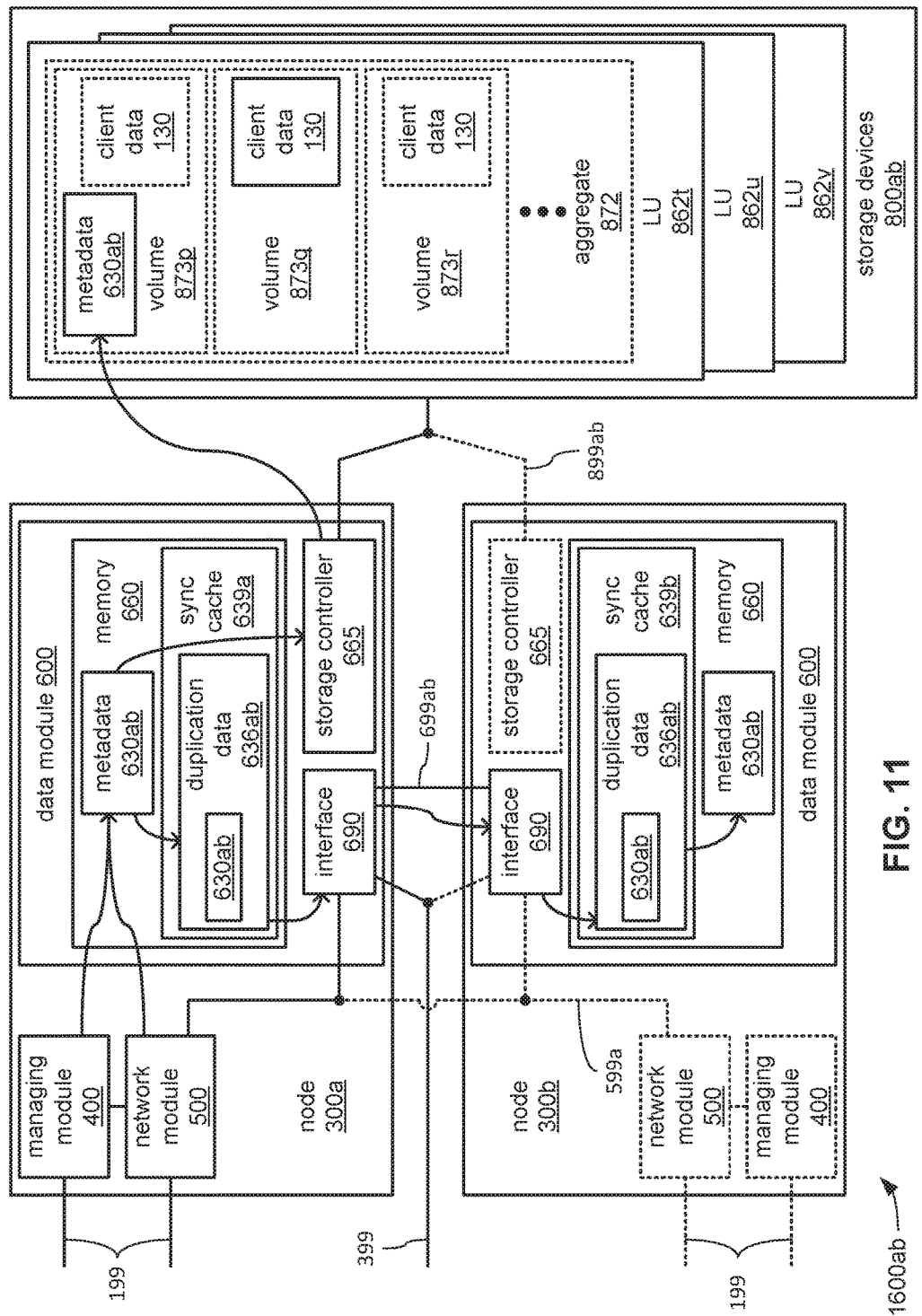
FIG. 11 illustrates an example embodiment of duplication and storage of metadata within a shared set of storage devices.

FIG. 11 illustrates a block diagram of another example embodiment of the HA group 1600ab of the cluster 1300a of the storage cluster system 1000 in greater detail. As again depicted, of the nodes 300a and 300b of the HA group 1600ab, the node 300a may be active to engage in communications with a client device 100 and/or the administration device 200, and/or may be active to perform operations altering the client data 130 within the set of storage devices 800ab, while the node 300b may be inactive and awaiting a need to take over for the node 300a. FIG. 11 also depicts various aspects of the generation, duplication and storage of the metadata 630ab within the set of storage devices 800ab alongside the client data 130 in greater detail.

Each of the sets of storage devices 800ab, 800cd and 800yz may be made up of storage devices based on any of a variety of storage technologies, including and not limited to, ferromagnetic "hard" or "floppy" drives, magneto-optical media drives, optical media drives, non-volatile solid state drives, etc. As depicted, the set of storage devices 800ab may include LUs 862t-v that may be operated together to form an array of storage devices. In some embodiments, the processor component 650 of the Data module 600 of the node 300a may operate the storage controller 665 to treat each of the storage devices of the set of storage devices 800ab as a separate LU and/or may be caused to treat a group of those storage devices as a single LU. Multiple LUs may be operated together via the storage controller 665 to implement a level of RAID or other form of array that imparts fault tolerance in the storage of data therein. The manner in which LUs are defined among one or more storage devices of the set of storage devices 800ab, and/or the manner in which multiple LUs may be operated together may be specified within the metadata 630ab.

The processor component 650 may be caused to allocate storage space in any of a variety of ways within a single LU and/or within multiple LUs operated together to form an array. In so doing, the processor component 650 may be caused to subdivide storage space in any of a variety of ways within a single LU and/or within multiple LUs that are operated together. By way of example, such subdivisions may be effected as part of organizing client data 130 into separate categories based on subject, as part of separating client data 130 into different versions generated over time, as part of implementing differing access policies to different pieces of client data 130, etc. In some embodiments, and as depicted, the storage space provided by within the LU 862t or within a combination of the LUs 862t-v may be designated as an aggregate 872. Further, the aggregate 872 may be subdivided into volumes 873p-r. The manner in which aggregates and/or volumes are defined may be selected to conform to the specification(s) of one or more widely known and used file systems, including and not limited to, Write Anywhere File Layout (WAFL). The manner in which aggregates and/or volumes within aggregates are allocated among a single LU or multiple LUs that are operated together may be specified within the metadata 630ab.

The client data 130 may be stored entirely within one of the volumes 873p-r, or may be distributed among multiple ones of the volumes 873p-r (as depicted). As also depicted, the metadata 630ab may also be stored within the set of storage devices 800ab along with client data 130, at least within the same aggregate 872. In some embodiments, the metadata 630ab may be stored within one or more of the same volumes 873p-r as client data 130 (as depicted). In other embodiments, the metadata 630ab may be stored within one of the volumes 873p-r that is separate from one or more others of the volumes 873p-r within which client data 130 may be stored. The manner in which the metadata 630ab and/or the client data 130 are to be organized within aggregates and/or values may be specified within the metadata 630ab itself.

As previously discussed, the Managing module 400 of the active node 300a may provide portions of metadata, including updates thereof, to the Network module 500 and/or the Data module 600 in response to receiving configuration information from one of the client devices 100. Again, such portions of metadata so provided by the Managing module 400 (and/or updates thereto) may include configuration information received in configuration data from the administration device 200 and/or one or more of the client devices 100. Also, the Network module 500 of the active node 300a may provide portions of metadata, including updates thereof, to the Data module 600 that indicate results of various tests performed by the Network module 500. Again, the portions of metadata so provided by the Network module 500 (and/or updates thereto) may include configuration information derived by the Network module 500 through the performance of various tests. And again, a duplicate of the metadata 630ab may be generated and stored within the sync cache 639a as a portion of duplication data 636ab, by which the duplicate of the metadata 630ab may be transmitted via the interface 690 and the HA interconnect 699ab to the Data module 600 of the inactive node 300b.

As the processor component 650 of the Data module 600 of one or more of the active nodes 300a-d and 300y-z are caused to create aggregates and/or volumes in corresponding ones of the sets of storage devices 800ab, 800cd and 800yz, those processor components 650 may monitor the process of doing so and record various results of those processes, such as failures in particular storage devices, instances of needing to resize one aggregate or volume to accommodate an expansion of another, and instances of automatically increasing the size of a volume or aggregate as a result of the storage of a larger quantity of client data 130 than could be accommodated by the original defined capacity of that volume or aggregate. Again, those ones of the processor component 650 may operate corresponding ones of the interfaces 690 to relay such information to the one of the Managing modules 400 that is in communication with the collection server 2400 to be relayed thereto.

Figure 12:
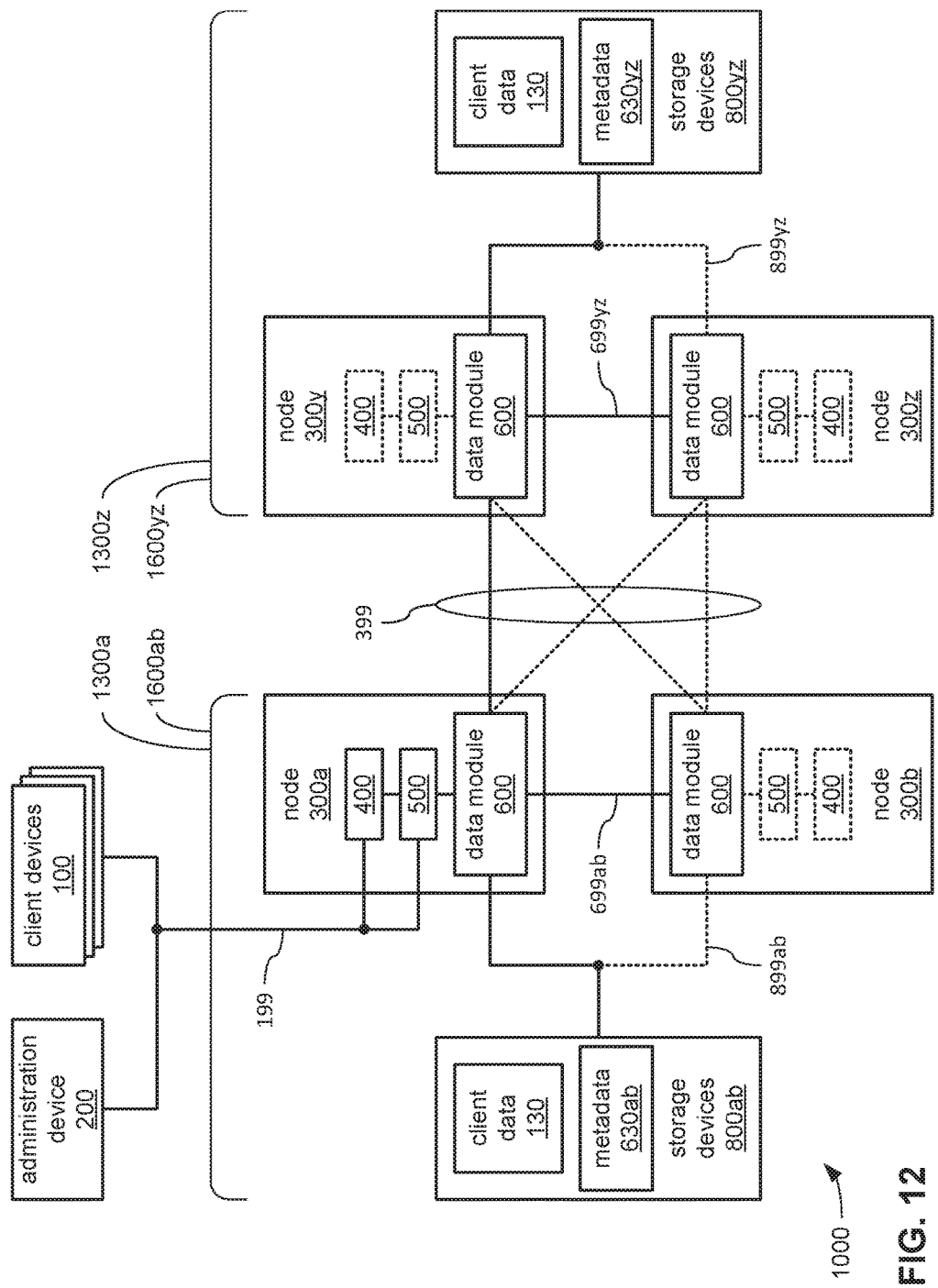
FIG. 12 illustrates an example embodiment of a mesh of communications sessions among nodes.

FIG. 12 depicts an example embodiment of a mesh of communications sessions formed among the nodes 300a-b and 300y-z through the inter-cluster interconnect 399 in greater detail. More specifically, through the inter-cluster interconnect 399, each of the nodes 300a and 300b of the HA group 1600ab forms a communications session with each of the nodes 300y and 300z of the HA group 1600yz, thereby forming the depicted mesh of communications sessions among the nodes 300a-b and 300y-z. As depicted, of these communications sessions, the communications session extending between the nodes 300a and 300y may be an active communications session (as indicated with a solid line), while the others of these communications sessions may be inactive communications sessions (as indicated with dotted lines). This reflects the fact that the nodes 300a and 300y, at least initially, are each the active nodes of the HA groups 1600ab and 1600yz, respectively, that engage in communications to exchange replica data access commands and associated data to enable at least partly parallel performance of data access commands between the HA groups 1600ab and 1600yz.

Thus, during normal operation of the storage cluster system 1000 in which the nodes 300a and 300y are active nodes and no errors occur within either of the nodes 300a or 300y, a request for storage services is received by the node 300a via the client interconnect 199 from one of the client devices 100. Following conversion of the storage services request into a data access command by the Network module 500 of the node 300a, the Data module 600 of the node 300a may both begin performance of the data access command and transmit a replica of that data access command to the node 300y via the active communications session formed through inter-cluster interconnect 399 between the nodes 300a and 300y. The Data module 600 of the node 300y may then perform the replica data access command at least partly in parallel with the performance of the data access command by the Data module 600 of the node 300a.

In preparation for such a transmission, the Data module 600 of the node 300a may cooperate with the Data module 600 of the node 300y to form the depicted active communications session between the nodes 300a to 300y through an exchange of messages requesting and accepting formation of the active communications session. Following its formation, the Data modules 600 of the nodes 300a and 300y may cooperate to maintain the active communications session by recurring exchanges of test signals (e.g., test messages) therethrough to monitor the state of the active communications session.

In addition to the Data modules 600 of the nodes 300a and 300y cooperating to form and maintain the depicted active communications session through the inter-cluster interconnect 399 to support such exchanges of replica data access commands, the Data modules 600 of all of the nodes 300a-b and 300y-z may cooperate to form and maintain the depicted inactive communications sessions through the inter-cluster interconnect 399 in preparation for handling an error condition affecting one of the nodes 300a or 300y. More specifically, test signals (e.g., test messages) may be exchanged through one or more of the inactive communications sessions to monitor their state.

In the event of a failure of at least a portion of the node 300a, the node 300b may take over for the node 300a, and in so doing, may change the state of the inactive communications session extending between the Data modules 600 of the nodes 300b and 300y into an active communications session. By doing so, the node 300b becomes able to transmit replica data access commands to the node 300y in place of the node 300a. Correspondingly, in the event of a failure of at least a portion of the node 300y, the node 300z may take over for the node 300y, and in so doing, may change the state of the inactive communications session extending between the Data modules 600 of the nodes 300a and 300z into an active communications session. By doing so, the node 300z becomes able to receive and perform replica data access commands from the node 300a in place of the node 300y. In either of these events, the active communications session extending between the D-modules of the nodes 300a and 300y may become inactive. In some embodiments, indications of such changes in which communication sessions are active and/or inactive may be relayed to the one of the Managing modules 400 that is in communication with the collection server 2400 to enable those indications to be relayed onward to the collection server 2400 alongside indications of which communication sessions were originally configured to be active, at least by default.

In various embodiments, each of the processor components 450, 550, 650, 2450, 2550 and 2650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked.

In various embodiments, one or more of the control routines 440, 540, 640, 2440, 2540 and 2640 may include one or more of an operating system, device drivers and/or application-level routines (e.g., so-called "software suites" provided on disc media, "applets" obtained from a remote server, etc.). As recognizable to those skilled in the art, each of the control routines 440, 540 and 640, including the components of which each may be composed, are selected to be operative on whatever type of processor or processors may be selected to implement applicable ones of the processor components 450, 550 or 650, or to be operative on whatever type of processor or processors may be selected to implement a shared processor component. In particular, where an operating system is included, the operating system may be any of a variety of available operating systems appropriate for corresponding ones of the processor components 450, 550 or 650, or appropriate for a shared processor component. Also, where one or more device drivers are included, those device drivers may provide support for any of a variety of other components, whether hardware or software components, of corresponding ones of the modules 400, 500 or 600.

In various embodiments, one or more the memories 460, 560, 660, 2460, 2560 and 2660 may be based on any of a wide variety of information storage technologies, possibly including volatile technologies requiring the uninterrupted provision of electric power, and possibly including technologies entailing the use of machine-readable storage media that may or may not be removable. Thus, each of these memories may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a RAID array). It should be noted that although each of these memories is depicted as a single block, one or more of these may include multiple storage devices that may be based on differing storage technologies. Thus, for example, one or more of each of these depicted memories may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these memories may be made up of multiple storage components based on identical storage technology, but which may be maintained separately as a result of specialization in use (e.g., some DRAM devices employed as a main memory while other DRAM devices employed as a distinct frame buffer of a graphics controller).

In various embodiments, one or more of the interfaces 490, 590, 690, 2490, 2590 and 2690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 13:
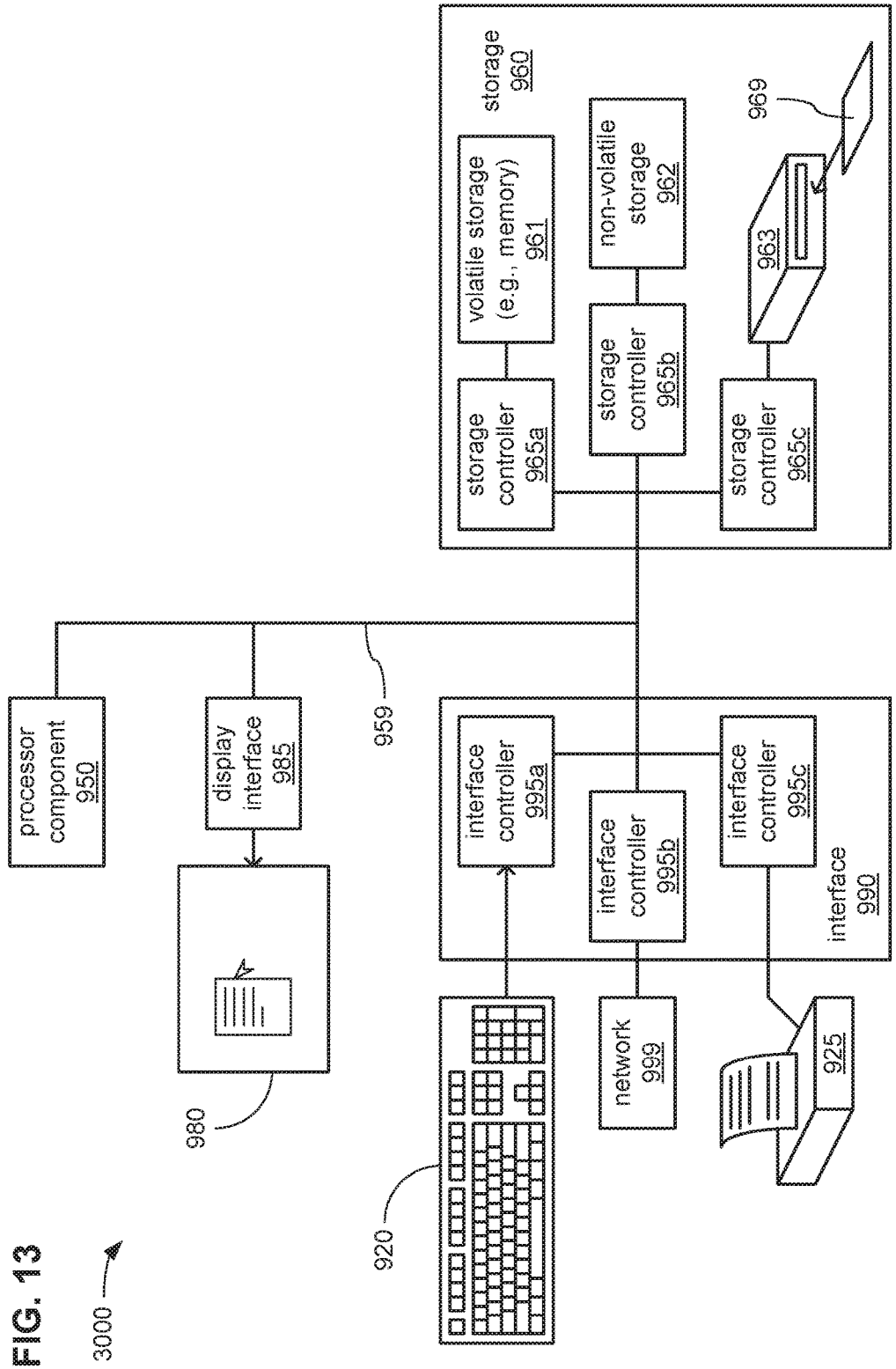
FIG. 13 illustrates a processing architecture according to an embodiment.

FIG. 13 illustrates an embodiment of an exemplary processing architecture 3000 suitable for implementing various embodiments as previously described. More specifically, the processing architecture 3000 (or variants thereof) may be implemented as part of one or more of the client devices 100, the administration devices 200, the nodes 300, the management modules 400, the network modules 500, the data modules 600, the authoring devices 2100, the administration devices 2200, the collection server 2400, the analysis server 2500, the visualization server 2600, the documentation server 2800, and the sets of storage devices 800ab, 800cd or 800yz. It should be noted that components of the processing architecture 3000 are given reference numbers in which the last two digits correspond to the last two digits of reference numbers of at least some of the components earlier depicted and described as part of the devices 100, 200, 800, 2100 and/or 2200; the servers 2400, 2500, 2600 and/or 2800; and/or the modules 400, 500 and 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, an internal storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the internal storage 960. Coupling 959 may further couple the processor component 950 to one or more of the interface 990 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 may include any of a wide variety of commercially available processors, employing any of a wide variety of technologies and implemented with one or more cores physically combined in any of a number of ways.

As previously discussed, the internal storage 960 may be made up of one or more distinct storage devices based on any of a wide variety of technologies or combinations of technologies. More specifically, as depicted, the internal storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the internal storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for long-term storage not requiring the continuing presence of the machine-readable storage medium 969 and/or the volatile storage 961 to enable more rapid access by the processor component 950 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920.

The interface controller 995b may employ any of a variety of cabling-based or wireless signaling, timings and/or protocols to access other computing devices through the depicted network 999 (perhaps a network made up of one or more links, smaller networks, or perhaps the Internet). The interface controller 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The invention claimed is:

1. A method comprising:
using a model data structure, by a processor, to store a plurality of storage system models and a plurality of component models of a networked storage environment, each system model indicating a storage system configuration including relationships between components of storage systems of the storage system models; and each of the plurality component models for components of the storage systems include a plurality of model entries, each model entry is associated with a different usage type comprising different combination of operations, wherein each of the plurality of component models provide a usage level and a performance level for the usage type;
predicting, by the processor, a first usage level for a first usage type of a first component of a first storage system based on a usage trend determined from a first component model;
determining, by the processor that the first usage level is indicative of a trouble event for the first component;
testing, by the processor, an alternative configuration for the storage system using a second component of a second component model; and
using, by the processor, the alternative configuration for the first usage type to reduce a likelihood of the trouble event occurring for the first usage type.

2. The method of claim 1, further comprising:
retrieving, by the processor, indications of a recent history of usage levels of the storage system under the first usage type; and
predicting, by the processor, a highest usage level of the storage system under the first usage type to occur within a predetermined future time frame based on the usage trend.

3. The method of claim 1, wherein further comprising:
providing a recommendation by the processor, to install the second component in the storage system based on whether application of the first usage level to the first component model results in a latency in propagation of data through the first component below a certain level of latency.

4. The method of claim 1, further comprising:
retrieving, by the processor, a data point comprising an indication of a second level of usage of the second component in another storage system under a second usage type; and
determining, by the processor, whether a combination of the second usage type and a component configuration of the second component differs from other combinations of usage type and component configuration associated with the second component by at least a threshold value.

5. The method of claim 4, further comprising:
storing, by the processor, a component model entry in the model data structure for the combination of the second usage type and component configuration of the second component based on a difference of at least the threshold value.

6. The method of claim 1, wherein the trouble event is an instance of a level of utilization of a resource provided by the first component that exceeds a certain level of utilization.

7. The method of claim 1, wherein the trouble event is an instance of latency in propagation of data through the first component that exceeds a certain level of latency.

8. A non-transitory, machine readable storage medium having stored thereon instructions comprising machine executable code which when executed by a machine, causes the machine to:
use, by a processor, a model data structure to store a plurality of storage system models and a plurality of component models of a networked storage environment, each system model indicating a storage system configuration including relationships between components of storage systems of the storage system models; and each of the plurality component models for components of the storage systems include a plurality of model entries, each model entry is associated with a different usage type comprising different combination of operations, wherein each of the plurality of component models provide a usage level and a performance level for the usage type;
predict, by the processor, a first usage level for a first usage type of a first component of a first storage system based on a usage trend determined from a first component model;
determine, by the processor that the first usage level is indicative of a trouble event for the first component;
test, by the processor, an alternative configuration for the storage system using a second component of a second component model; and use, by the processor, the alternative configuration for the first usage type to reduce a likelihood of the trouble event occurring for the first usage type.

9. The storage medium of claim 8, the machine executable code further causes the machine to:
retrieve indications of a recent history of usage levels of the storage system under the first usage type; and
predict a highest usage level of the storage system under the first usage type to occur within a predetermined future time frame based on the usage trend.

10. The storage medium of claim 8, the machine executable code further causes the machine to:
provide a recommendation, by the processor, to install the second component in the storage system based on whether application of the first usage level to the first component model results in latency in propagation of data through the first component below a certain level of latency.

11. The storage medium of claim 8, the machine executable code further causes the machine to:
retrieve, by the processor, a data point comprising an indication of a second level of usage of the second component in another storage system under a second usage type; and
determine, by the processor, whether a combination of the second usage type and a component configuration of the second component differs from other combinations of usage type and component configuration associated with the second component by at least a threshold value.

12. The storage medium of claim 11, the machine executable code further causes the machine to:
store, by the processor, a component model entry in the model data structure for the combination of the second usage type and component configuration of the second component based on a difference of at least the threshold value.

13. The storage medium of claim 8, wherein the trouble event is an instance of a level of utilization of a resource provided by the first component that exceeds a certain level of utilization.

14. The storage medium of claim 8, wherein the trouble event is an instance of latency in propagation of data through the first component that exceeds a certain level of latency.

15. A system, comprising:
a memory containing machine readable medium comprising machine executable code having stored thereon instructions; and a processor module coupled to the memory, the processor module configured to execute the machine executable code to:
use a model data structure for storing a plurality of storage system models and a plurality of component models of a networked storage environment, each system model indicating a storage system configuration including relationships between components of storage systems of the storage system models; and each of the plurality component models for components of the storage systems include a plurality of model entries, each model entry is associated with a different usage type comprising different combination of operations, wherein each of the plurality of component models provide a usage level and a performance level for the usage type;
predict a first usage level for a first usage type of a first component of a first storage system based on a usage trend determined from a first component model;
determine that the first usage level is indicative of a trouble event for the first component;
test an alternative configuration for the storage system using a second component of a second component model; and
use the alternative configuration for the first usage type for reducing a likelihood of the trouble event occurring for the first usage type.

16. The system of claim 15, the machine executable code further causes to:
retrieve indications of a recent history of usage levels of the storage system under the first usage type; and
predict a highest usage level of the storage system under the first usage type to occur within a predetermined future time frame based on the usage trend.

17. The system of claim 15, the machine executable code further causes to:
provide a recommendation to install the second component in the storage system based on whether an application of the first usage level to the first component model results in a latency in propagation of data through the first component below a certain level of latency.

18. The system of claim 15, the machine executable code further causes to:
retrieve a data point comprising an indication of a second level of usage of the second component in another storage system under a second usage type; and
determine whether a combination of the second usage type and a component configuration of the second component differs from other combinations of usage type and component configuration associated with the second component by at least a threshold value.

19. The system of claim 18, the machine executable code further causes to:
store a component model entry in the model data structure for the combination of the second usage type and component configuration of the second component based on a difference of at least the threshold value.

20. The system of claim 15, wherein the trouble event is an instance of a level of utilization of a resource provided by the first component that exceeds a certain level of utilization.

* * * * *